US011688184B2

(12) United States Patent
Austin et al.

(10) Patent No.: US 11,688,184 B2
(45) Date of Patent: Jun. 27, 2023

(54) DRIVING AUTOMATION EXTERNAL COMMUNICATION LOCATION CHANGE

(71) Applicant: TOYOTA MOTOR ENGINEERING & MANUFACTURING NORTH AMERICA, INC., Plano, TX (US)

(72) Inventors: Benjamin P. Austin, Saline, MI (US); Joshua E. Domeyer, Madison, WI (US); John K. Lenneman, Okemos, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 331 days.

(21) Appl. No.: 16/903,721

(22) Filed: Jun. 17, 2020

(65) Prior Publication Data

US 2021/0394793 A1    Dec. 23, 2021

(51) Int. Cl.
    *G06V 20/59* (2022.01)
    *B60W 60/00* (2020.01)
    (Continued)

(52) U.S. Cl.
    CPC .............. *G06V 20/59* (2022.01); *B60Q 1/503* (2013.01); *B60W 40/08* (2013.01);
    (Continued)

(58) Field of Classification Search
    CPC ......... B60W 60/0017; B60W 60/0027; B60W 40/08; B60W 2554/4029;
    (Continued)

(56) References Cited

U.S. PATENT DOCUMENTS 9,255,989 B2   2/2016   Joshi et al.
9,701,239 B2   7/2017   Kentley et al.
(Continued)

FOREIGN PATENT DOCUMENTS

JP      2003-95046 A      4/2003
WO   WO 2013/145984 A1   10/2013

OTHER PUBLICATIONS

Kirsten Korosec, "Toyota is Betting on This Startup to Drive Its Self-Driving Car Plans Forward", Fortune Media LP Limited, https://fortune.com/2017/09/27/toyota-self-driving-car-luminar/, Sep. 27, 2017, 6 pages.

*Primary Examiner* — Yazan A Soofi
(74) *Attorney, Agent, or Firm* — Oblon, McClelland, Maier & Neustadt, L.L.P.

(57) ABSTRACT

A method, system and non-transitory computer readable medium which monitor a road user in order to move the external position of the vehicle intent notification (eHMI) to another external position that can be seen by the road user based on the gaze direction of the road user. In some aspects, the eHMI notification displays the vehicle intent for a single autonomous vehicle. In another aspect, a group eHMI notification displays the trajectories for a plurality of autonomous and non-autonomous vehicles. Based on the gaze direction of the road user, the eHMI notification can be displayed on a single external position or on multiple external positions. Different eHMI notifications can be displayed at different external positions on the autonomous vehicle to provide information to more than one road user.

17 Claims, 16 Drawing Sheets

(51) Int. Cl.
  *G05D 1/02*     (2020.01)
  *B60W 40/08*    (2012.01)
  *G08G 1/16*     (2006.01)
  *G06T 3/40*     (2006.01)
  *G06T 7/20*     (2017.01)
  *G06T 7/70*     (2017.01)
  *B60Q 1/50*     (2006.01)
  *G05D 1/00*     (2006.01)
  *G06V 20/56*    (2022.01)
  *G06V 40/10*    (2022.01)
  *G06F 18/25*    (2023.01)
  *G06V 40/18*    (2022.01)

(52) U.S. Cl.
  CPC .... *B60W 60/0017* (2020.02); *B60W 60/0027* (2020.02); *G05D 1/0088* (2013.01); *G05D 1/0253* (2013.01); *G06F 18/251* (2023.01); *G06T 3/4038* (2013.01); *G06T 7/20* (2013.01); *G06T 7/70* (2017.01); *G06V 20/56* (2022.01); *G06V 40/103* (2022.01); *G06V 40/18* (2022.01); *G08G 1/16* (2013.01); *B60W 2420/42* (2013.01); *B60W 2420/52* (2013.01); *B60W 2540/225* (2020.02); *B60W 2554/4029* (2020.02); *G05D 2201/0213* (2013.01); *G06T 2207/20212* (2013.01); *G06T 2207/30196* (2013.01); *G06T 2207/30236* (2013.01); *G06T 2207/30241* (2013.01); *G06T 2207/30252* (2013.01)

(58) Field of Classification Search
  CPC .... B60W 2540/225; G06T 7/70; G06V 20/56; B60Q 1/503; G05D 1/0088; G05D 1/0253
  USPC .......................................................... 701/23
  See application file for complete search history.

(56) References Cited

U.S. PATENT DOCUMENTS

| | | | |
|---|---|---|---|
| 9,829,889 | B1 | 11/2017 | Kusano et al. |
| 9,953,538 | B1* | 4/2018 | Matthiesen ............ B60Q 1/543 |
| 10,086,832 | B2 | 10/2018 | Kwon et al. |
| 10,196,058 | B2 | 2/2019 | Paris et al. |
| 10,471,970 | B2 | 11/2019 | Won |
| 10,497,255 | B1 | 12/2019 | Shmueli Friedland et al. |
| 11,231,905 | B2* | 1/2022 | Cordourier Maruri ...................... H04R 1/406 |
| 11,449,768 | B2* | 9/2022 | Kwant ................. G06K 9/6218 |
| 2018/0260635 | A1 | 9/2018 | Al-Dahle et al. |
| 2018/0276986 | A1* | 9/2018 | Delp ...................... B60K 35/00 |
| 2019/0265703 | A1* | 8/2019 | Hicok .................. G05D 1/0242 |
| 2019/0362626 | A1* | 11/2019 | Mangai ................... H04W 4/40 |
| 2020/0247434 | A1* | 8/2020 | Kim ................... B62D 15/0265 |
| 2021/0380137 | A1* | 12/2021 | Domeyer .............. B60W 30/09 |
| 2022/0097524 | A1* | 3/2022 | Choi .................. G02B 27/0101 |

* cited by examiner

DRIVING AUTOMATION EXTERNAL COMMUNICATION LOCATION CHANGE

TECHNICAL FIELD

The present disclosure is directed to methods for presenting external human-machine interface (eHMI) notifications to a road user at an external location on the vehicle that the road user can see.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Upcoming regulations will most likely dictate where automated vehicle intent notifications (i.e., eHMI notifications) can be displayed on the automated vehicle. The eHMI may be in the form of external light bars, flashing lights added to the front of the vehicle, or the like. The standard/regulated eHMI placement may be above the headlights, on the roof, in the headlight, within the grill, etc. Depending on the viewing angle, the eHMI may not be viewable to a particular road user in the vicinity of the automated vehicle.

Accordingly, it is an object of the present disclosure to provide methods and systems for placing eHMI notifications on vehicle positions which can be easily viewed by a particular road user in the vicinity of the automated vehicle.

SUMMARY

In an exemplary embodiment, a method for displaying at least one external human-machine interface (eHMI) notification identifying a plurality of autonomous vehicles travelling on a trajectory near a road user is described, comprising receiving images of an environment transmitted from the plurality of autonomous vehicles, receiving trajectory information from each of the plurality of autonomous vehicles, stitching together the images to form a global view of the environment, correlating the global view with the trajectory information of each of the plurality of autonomous vehicles, identifying each road user in the global view of the environment, determining a gaze direction of each road user, determining an intent of each road user to intersect with one or more of the trajectories, generating an eHMI notification which includes at least one of a message and a symbol indicating the trajectory of at least one of the plurality of autonomous vehicles, and displaying the eHMI notification on an external display of at least one of the autonomous vehicles which is within an unoccluded field of view of each road user based on the gaze direction.

In another exemplary embodiment, a system for displaying at least one external human-machine interface (eHMI) notification to a road user is described, comprising an autonomous vehicle having a plurality of eHMI notification displays located at different external positions, wherein the plurality of notification displays are configured for independent activation, a plurality of sensors configured to generate images of the surrounding environment, an eye tracking unit configured to track the eye positions of the road user, a computing device operatively connected to the plurality of notification devices, the eye tracker and the plurality of sensors, the computing device including a computer-readable medium comprising program instructions, executable by processing circuitry, to cause the processing circuitry to determine a gaze direction of the road user based on the eye positions, a head pose and a body posture of the road user, estimate the intent of the road user to move into a trajectory of the autonomous vehicle, and provide an eHMI notification on at least one of the plurality of eHMI notification displays which is within an unoccluded field of view of each road user.

In another exemplary embodiment, a non-transitory computer readable medium having instructions stored therein that, when executed by one or more processor, cause the one or more processors to perform a method for displaying at least one external human-machine interface (eHMI) notification identifying a plurality of autonomous vehicles travelling on a trajectory near a road user is described, comprising receiving images of an environment transmitted from the plurality of autonomous vehicles, receiving trajectory information from each of the plurality of autonomous vehicles, stitching together the images to form a global view of the environment, correlating the global view with the trajectory information of each of the plurality of autonomous vehicles, identifying each road user in the global view of the environment, determining a gaze direction of each road user, determining an intent of each road user to intersect with one or more of the trajectories, generating an eHMI notification which includes at least one of a message and a symbol indicating the trajectory of at least one of the plurality of autonomous vehicles, and displaying the eHMI notification on an external display of at least one of the autonomous vehicles which is within an unoccluded field of view of each road user based on the gaze direction.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
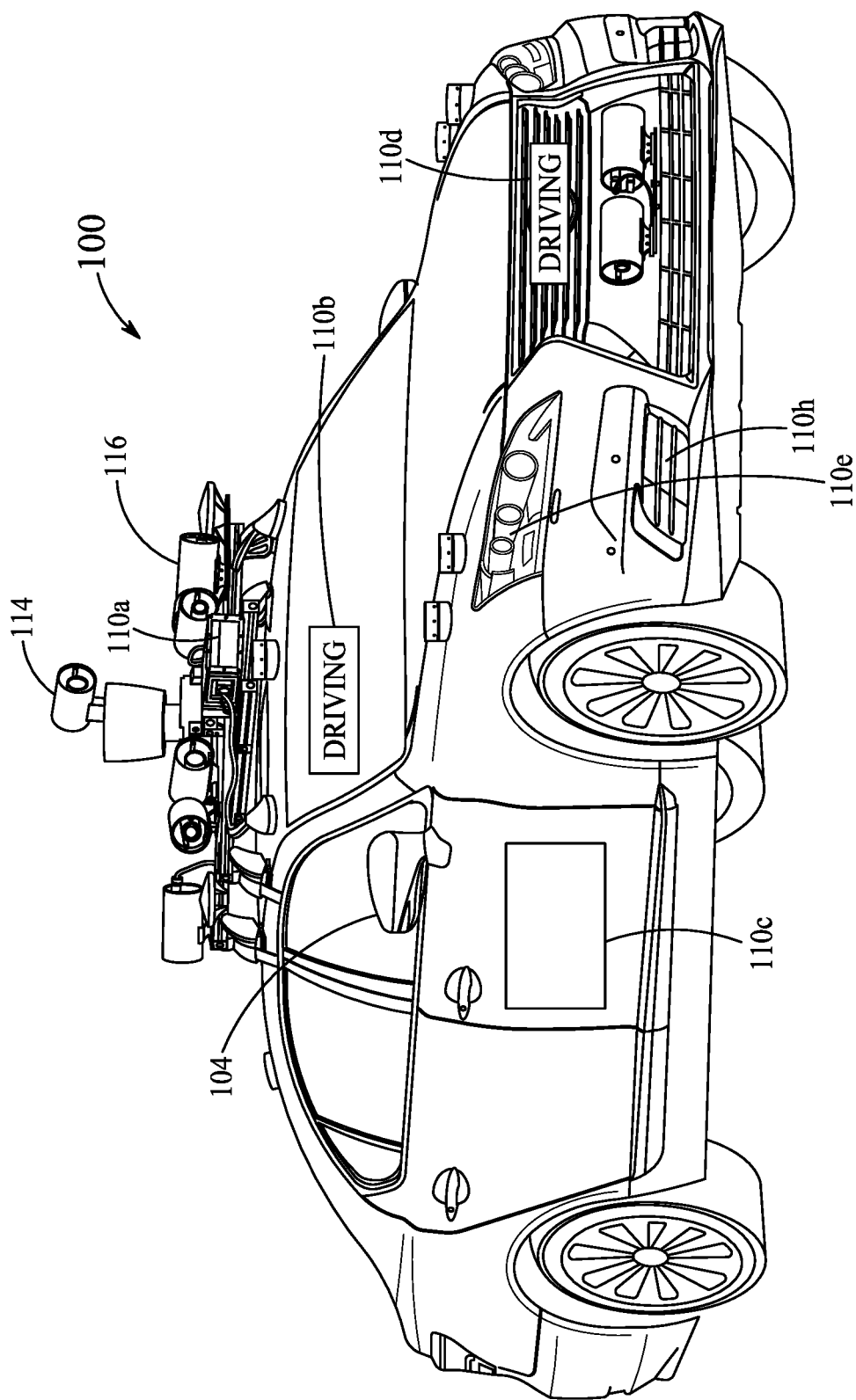
FIG. 1A is a front view of an exemplary autonomous vehicle having eHMI displays in various external positions, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

An autonomous vehicle is a vehicle that is capable of sensing its environment and navigating with little or no user input. A semi-autonomous vehicle is capable of sensing is environment and controlling at least some aspects of navigation, such as controlling braking, cruise control, taking control of the steering during an accident, or the like. Both autonomous and semi-autonomous vehicles sense the environment by using vehicle sensing devices such as radar, LiDAR, image sensors, millimeter wave radar and the like. Autonomous vehicles further use information from global positioning systems (GPS) technology, navigation systems, vehicle-to-vehicle (V2V) communication, vehicle-to-infrastructure technology (V2I), infrastructure-to-vehicle (V2I/I2V) communication and/or drive-by-wire systems to navigate the vehicle.

Autonomous vehicles further use information from global positioning systems (GPS) technology, navigation systems, vehicle-to-vehicle communication, vehicle-to-infrastructure technology, and/or drive-by-wire systems to navigate the vehicle.

An autonomous vehicle may be fully autonomous or perform only some self-driving maneuvers. For either type of vehicle, an electronic vehicle intent notification (eHMI) which alerts pedestrians and surrounding vehicles of the current or future actions of the autonomous vehicle is necessary to prevent accidents.

In the present disclosure, "road user" is defined as any of a non-autonomous vehicle, a pedestrian, a motorcyclist, a bicyclist, any human driven conveyance or autonomous vehicles operating in manual mode. "Road user" as defined in the present disclosure does not include autonomous vehicles or self-driving vehicles operating in fully or partially autonomous modes.

The autonomous vehicle(s) may be travelling "near" a road user. In the present disclosure, "near" and "nearby" are defined as within 500 feet of the road user.

The trajectory of an autonomous vehicle and the trajectory of the road user as defined herein may intersect, run parallel, run antiparallel or at an angle with one another. The road user is made aware of the trajectory of the autonomous vehicle by the eHMI notification so as to make decisions regarding his/her own trajectory. For example, the road user may be a driver of a non-autonomous vehicle who wants to change lanes when travelling on a common trajectory with a plurality of autonomous vehicles. An eHMI notification informs the road user of the intents of the autonomous vehicles surrounding his/her vehicle to stay on or change trajectories so that the road user can decide whether it is safe to change lanes. In another example, the road user may be a pedestrian who wants to cross a street at a crosswalk. An eHMI notification informs the pedestrian of the intent of an oncoming autonomous vehicle to slow down, stop, turn left, turn right or drive through the crosswalk so the pedestrian can decide whether or not to cross the street at that time. An eHMI notification can be merely informative, even when there is no danger of collision. For example, a road user may be a pedestrian or bicyclist travelling on a sidewalk next to a roadway. An autonomous vehicle on the roadway may display the eHMI notification in a location within the field of view of the pedestrian or bicyclist to allow the pedestrian or bicyclist to make future decisions as to his/her trajectory. For example, a pedestrian may walk behind a passing autonomous vehicle to enter another vehicle in an adjacent lane. The eHMI notification indicating the stopping, slowing or driving status of the autonomous vehicle lets the pedestrian know the timing of his/her own movement.

The vehicle must be able to predict when a road user, such as pedestrian, a bicyclist or a driver of a non-autonomous vehicle, may impinge on the trajectory of the vehicle, and provide an eHMI in a position where the road user can view the eHMI. There have been numerous proposals regarding methods that notify road users (e.g., pedestrian, cyclists, etc.) of autonomous vehicle intent. However, there is a need for an effective method of manipulating the position of the notification if the autonomous vehicle predicts that the road user is not able to view the notification at the present location.

The present disclosure describes methods and a system which monitor the road user in order to move the external location of the vehicle intent notification (eHMI) to another external position that can be seen by the road user based on the field of view as determined by the gaze direction, head pose and body posture of the road user.

Depending on the viewing angle, the eHMI may not be viewable to a particular road user in the vicinity of the automated vehicle. Urban environments increase the likelihood eHMI occlusion due to numerous obstacles in and around the roadway. The system and methods of the present disclosure monitor the road user (e.g., head pose, body posture, movement, etc.) to determine a gaze direction with respect to the vehicle and to determine whether the standard location of the eHMI is viewable by the road user. If it is determined that the road user cannot view the eHMI in the standard location, the system moves the eHMI to an external location on the vehicle that is viewable.

In an aspect of the present disclosure, the autonomous vehicle may identify a road user by an image or series of images recorded by vehicle camera. The images may be timestamped by an image processor and analyzed for changes in motion, head pose and body posture in order to determine a gaze direction of the road user. The ability of a camera to record a high dynamic range image, whether by taking one snapshot or a sequence, may be limited by the presence of veiling glare, which is the tendency of bright objects in the scene to reduce the contrast everywhere within the field of view. Glare may be especially strong during morning, noon, sunset and at night when other vehicles have their headlights on and may overwhelm the images. To some extent, glare may be reduced by the structure of the camera, such as by using a lens hood. However, the image processing should include glare compensation in order to provide sharp images.

The image sensors may include cameras having a RGB-D (red-green-blue-depth) sensors or similar imaging sensors that may capture images including four channels, i.e., three color channels and a depth channel configured to capture color images.

Additionally, the autonomous vehicle may identify a road user by data recorded by a LiDAR (light detection and ranging) rotating 360° scanner. LiDAR acts as an eye of an autonomous (self-driving) vehicle. It provides a 360-degree view of the surrounding area.

A continuously rotating LiDAR system sends thousands of laser pulses every second. These pulses collide with the surrounding objects and reflect back. The resulting light reflections are then used to create a 3D point cloud. An onboard computer records the reflection point of each laser and translates this rapidly updating point cloud into an animated 3D representation. The 3D representation is created by measuring the speed of light and the distance covered from the LiDAR device to an object and back to the LiDAR device (time of flight measurements) which helps to determine the position of the vehicle with respect to other surrounding objects.

The 3D representation may be used to monitor the distance between the autonomous vehicle and any other vehicles or pedestrians on the road passing by, in front, behind or in a common trajectory with the autonomous vehicle. LiDAR enables the vehicle to differentiate between a person on a bicycle or a person walking, and their speed and direction. The 3D representation may also be used to determine when to command the brakes to slow or stop the vehicle, or to speed up when the roadway is clear. Further, the 3D representation may be used to determine the position, body posture and head pose of the road user in order to determine the gaze direction of the road user. In order to determine the gaze direction, the computer system may use the cameras images, LiDAR data and radar images to determine the age of the road user. For example, a child may be smaller than an adult and may not be able to see the displays from the same angle as an adult; therefore the most optimal eHMI may be a symbol on a lower display or an auditory warning. Seniors may have reduced neck motion, which may affect the determination of the gaze direction.

Additionally, the autonomous vehicle may use radar sensors to detect road users. The radar sensors may include millimeter wave radar sensors. The computer of the vehicle is configured to use data gathered by camera image analysis, LiDAR 3D point cloud analysis and radar and/or millimeter wave radar images to determine the gaze direction of the road user. When one or more of the sensors is a camera, computer vision techniques are used to detect road users. These techniques can include object recognition, including shape and edge detection. Both LiDAR and camera recognition processes can be performed based on trained and/or predefined libraries of data, with known and recognizable shapes and edges of obstacles (e.g. vehicles, cyclists, etc.). Radar sensors can report detected obstacles along with a velocity of the obstacles.

The autonomous vehicle may include a computer system having circuitry and stored program instructions that, when executed by one or more processor, determine the intent of the road user to enter a trajectory of the autonomous vehicle and whether the road user is able to see a standard eHMI of the autonomous vehicle from the camera, LiDAR and radar images. The autonomous vehicle may place the eHMI at a position which is more easily viewed by the road user. Alternatively, the autonomous vehicle may keep the eHMI at the standard position and additionally place the same or a different eHMI at a more viewable location. This may be advantageous as eHMI positions on vehicles become standardized and a road user's gaze may look first at the standard position. In some situations, the road user may be only able to view part of the eHMI notification, therefore a secondary location for the eHMI which is clearly viewable by the road user may allow the entire notification to be read. If the standard position is completely blocked from view, the road user may not be able to determine changes in the vehicle trajectory, such as switching lanes, making turns or braking which may be signaled or otherwise communicated. In this situation, placing the eHMI on a more viewable position of the vehicle (or even on another vehicle) may prevent an accident. Trajectory estimation is further described in U.S. Pat. No. 9,255,989B2, incorporated herein by reference in its entirety.

A "standard" or most common external position of an eHMI on an autonomous vehicle is on the front grill, top of the windshield or roof of the vehicle. Brake lights, turn signals, flashers and other vehicle standard equipment may also be part of the intent notification.

Less common eHMI external positions are the side doors, rear bumper, in the headlights and above the wheels. Additionally, an eHMI may be projected on a road surface by a projector mounted on the roof of the vehicle. The projection on the road surface may be most effective when the autonomous vehicle is stopped, such as at a cross walk.

An eHMI located on the roof of an autonomous vehicle may be omnidirectional, providing a 360° view by rotation of the display.

FIG. 1A shows an exemplary autonomous vehicle 100 having a sensing platform holding 360° projector 114, a plurality of LiDAR scanners 116, capturing a 360° view, and an eHMI display 110*a* on the roof. The sensing platform may also hold the radar sensors and cameras, although the radar sensors and cameras may be placed on a plurality of locations on the vehicle, such as rear view mirrors, side mirrors (i.e., 104), in the rear window or configured in the top of the trunk as needed for providing a clear, 360 degree view of the surrounding environment. At least some of the cameras are operatively connected to software to identify and focus the camera to track eye positions of road users. The autonomous vehicle may also include any of an eHMI display 110*b* at the top of the windshield, on the side doors (display 110*c*), on the front grill (display 110*d*), on the rear bumper (display 110*f*, FIG. 1B) and above or on the rear trunk lid or on the rear windshield (display 110*g*, FIG. 1B). Further, the headlight housings or turn signal housings may be configured with eHMI displays (110*e*, 110*h*), capable of displaying icons or text, such as left or right arrows or the words "Left Turn" or "Right Turn". The displays may be configured to display different icons or messages. Additionally, the displays may show the same or different eHMI notifications directed towards the gaze directions of a plurality of road users. Displays mounted on transparent glass surfaces may be configured so that the eHMI can be displayed on the outside of the vehicle but appears clear to a passenger on the inside of the vehicle. The displays may be adjustable, rotatable or tiltable through actuation of motor(s) by a controller of a vehicle computing system in order to provide a road user the eHMI notification in the field of view indicated by his/her gaze direction. The autonomous vehicle may also have a plurality of cameras (not shown) and radar sensors (not shown) located around the body or on the roof of the vehicle.

Figure 1B:
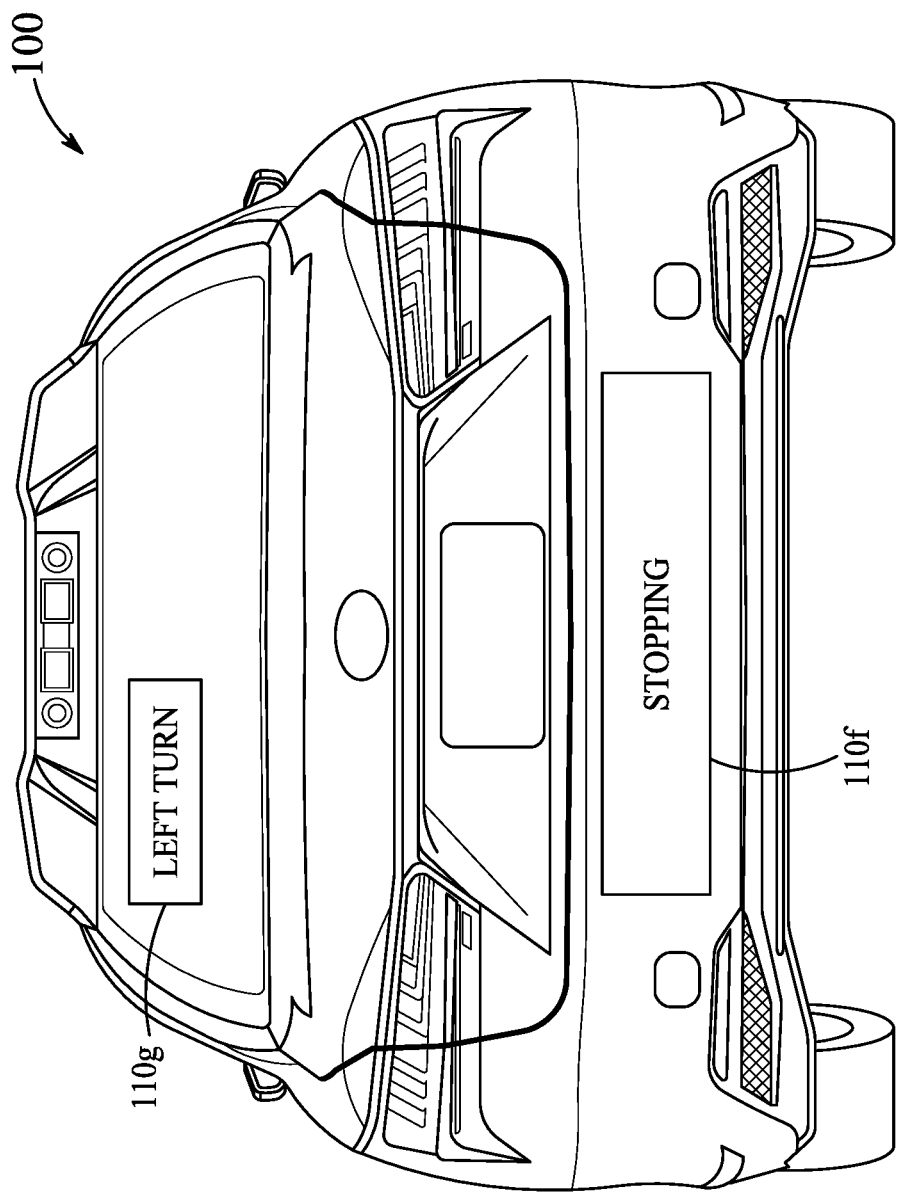
FIG. 1B is a rear view of an exemplary autonomous vehicle having eHMI displays in various external positions, according to certain embodiments.

FIG. 1B illustrates the rear of another type of exemplary autonomous vehicle having the eHMI displays 110*f* on the rear bumper and 110*g* on the rear window. In FIG. 1B, the sensing platform (as shown in FIG. 1A) on the roof of the vehicle has been covered for better protection from the elements and to streamline the vehicle.

Figure 1C:
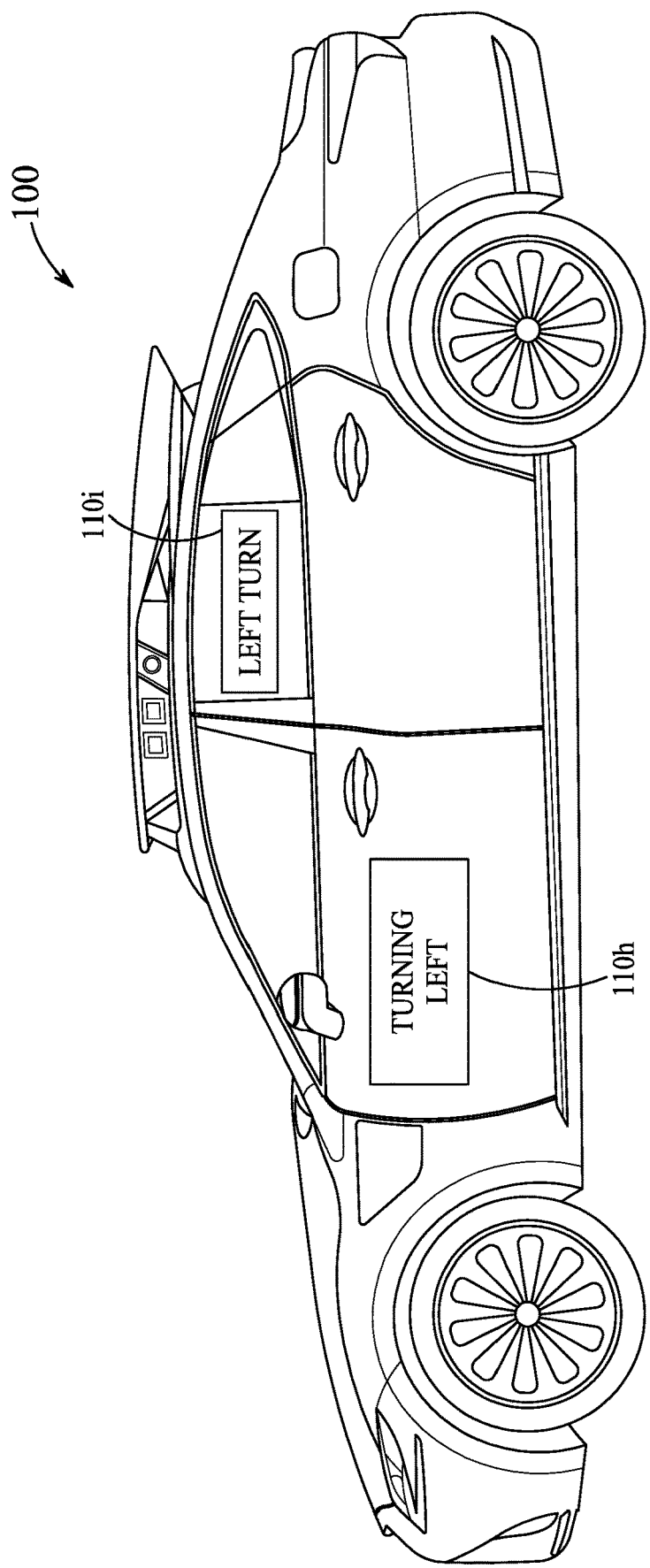
FIG. 1C is a side view of an exemplary autonomous vehicle having eHMI displays in various external positions, according to certain embodiments.

FIG. 1C shows a side view of the exemplary autonomous vehicle of FIG. 1B having an eHMI display 110*h* on the left front door panel and another eHMI display 110*i* on the left back door window. The locations of the eHMI displays are not limited, and may be placed at any external position on the vehicle which is deemed visible and does not interfere with the operation of the vehicle. The arrangement of sensing platforms is generally found on the roof of the vehicle and the illustrations are not limiting as to the style and particular arrangement, which may vary as to vehicle model and functionality.

Figure 2A:
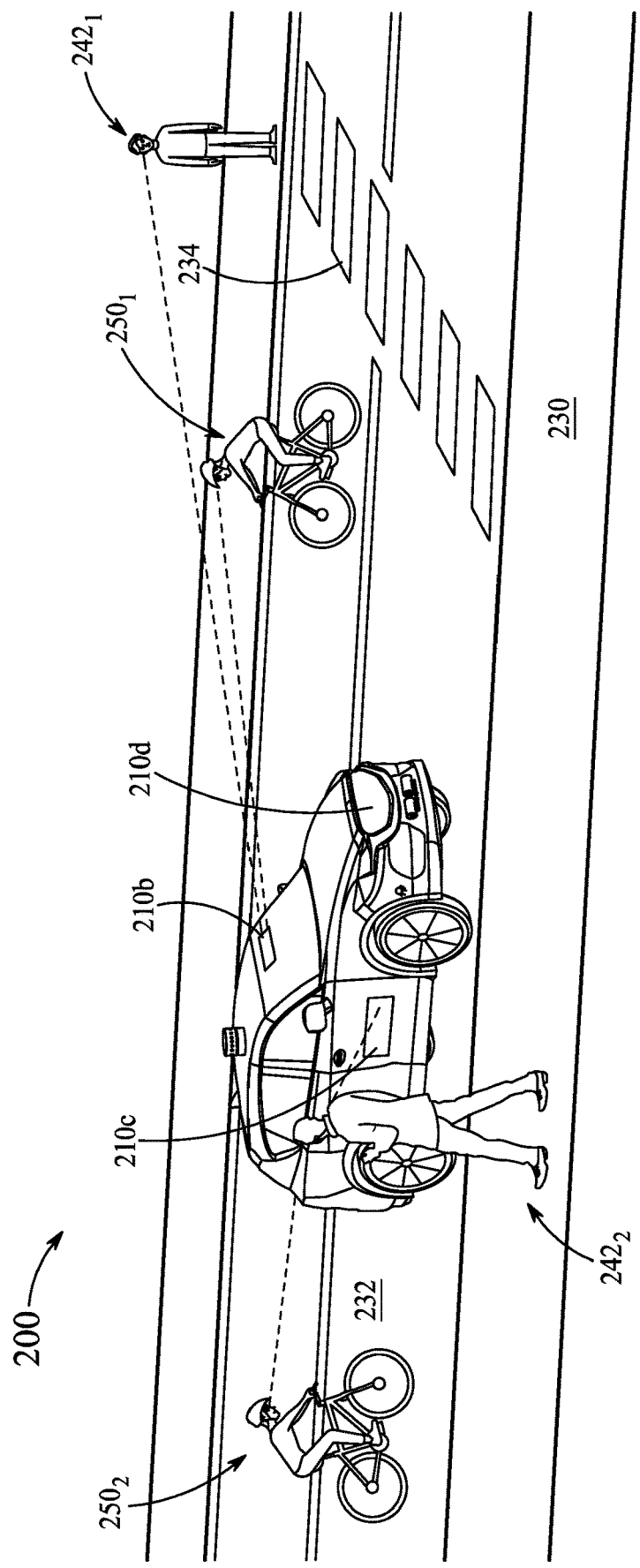
FIG. 2A is an illustration of a generalized autonomous vehicle at a pedestrian crosswalk, according to certain embodiments.

FIG. 2A illustrates the autonomous vehicle 200 having a general indication of the sensing platform, as the actual conformation of the sensing platform is not limiting in the present disclosure and is identified for exemplary purposes only. The autonomous vehicle has an eHMI notification display on the windshield (210*b*), on the front grill (210*d*), on the right side (210*c*) and on the left side (110*h*, FIG. 1C, not explicitly illustrated in this view). The roadway 232 is shown as a two way road.

If the road user is a pedestrian $242_1$, he/she may first look at the windshield of an approaching vehicle in order to determine the intention or information about the situational awareness of the driver. An autonomous vehicle 200 may not have a driver or may have a passenger in the position of a driver but not in control of the vehicle. Therefore, an eHMI notification 210*b* located on the windshield may be more effective than one located in another position.

The autonomous vehicle 200 is travelling on a two way roadway 232 towards crosswalk 234. The computing device of the autonomous vehicle continuously takes at least one of camera, LiDAR and radar images of the surrounding environment to monitor for road users which might impinge on the trajectory of the autonomous vehicle. An eye tracking camera (not shown) may be located on the back of a rear view mirror inside the autonomous vehicle to track the eye positions of road users in front of the autonomous vehicle. Cameras installed on a plurality of locations of the autonomous vehicle may be configured as eye trackers as needed, based on the positions of the road users. The autonomous vehicle "sees" pedestrians $242_1$ and $242_2$ and bicyclists $250_1$ and $250_2$. The computing device is able to perceive the crosswalk 234 and can predict that the trajectory of pedestrian $242_1$ crosses the trajectory of autonomous vehicle 200 by using motion analysis. The computing device is able to determine whether the pedestrian and the autonomous vehicle are in danger of colliding if either the autonomous vehicle or the pedestrian $242_1$ does not stop or otherwise alter trajectory. The computing device can determine the field of view of pedestrian $242_1$ and activate an eHMI display with a notification of the intent of the vehicle to stop, turn or drive through in a position on the vehicle which is within the field of view of the pedestrian $242_1$.

Pedestrian $242_2$ is shown walking parallel to the direction of travel of the autonomous vehicle and is not on a collision course with the autonomous vehicle. However, the computing device is able to determine that the gaze direction of pedestrian $242_2$ is in the direction of the right side of autonomous vehicle and that pedestrian $242_2$ should be able to see an eHMI notification on the right side of the autonomous vehicle presented on display 210*c* if needed. In a non-limiting example, when the autonomous vehicle intends to stop at the crosswalk the eHMI notification at 210*c* may be "Stopping".

Bicyclist $250_1$ is travelling in the roadway 232 in an opposing direction to the autonomous vehicle and would thus be able to view only the left side of the vehicle clearly. In this situation, an eHMI display located on the left door (as shown as 110*h* in FIG. 1C) of the vehicle or on a side window (as shown as 110*i* in FIG. 1C) may be the most effective location.

Bicyclist $250_2$ is travelling behind the autonomous vehicle and can see the rear of the autonomous vehicle, but not the front or the sides. Autonomous vehicle 200 may display its intent to stop or to drive through the crosswalk by an eHMI on a rear display (110*f*, 110*g*, FIG. 1B) in order that the bicyclist will know the intent of the autonomous vehicle.

Figure 2B:
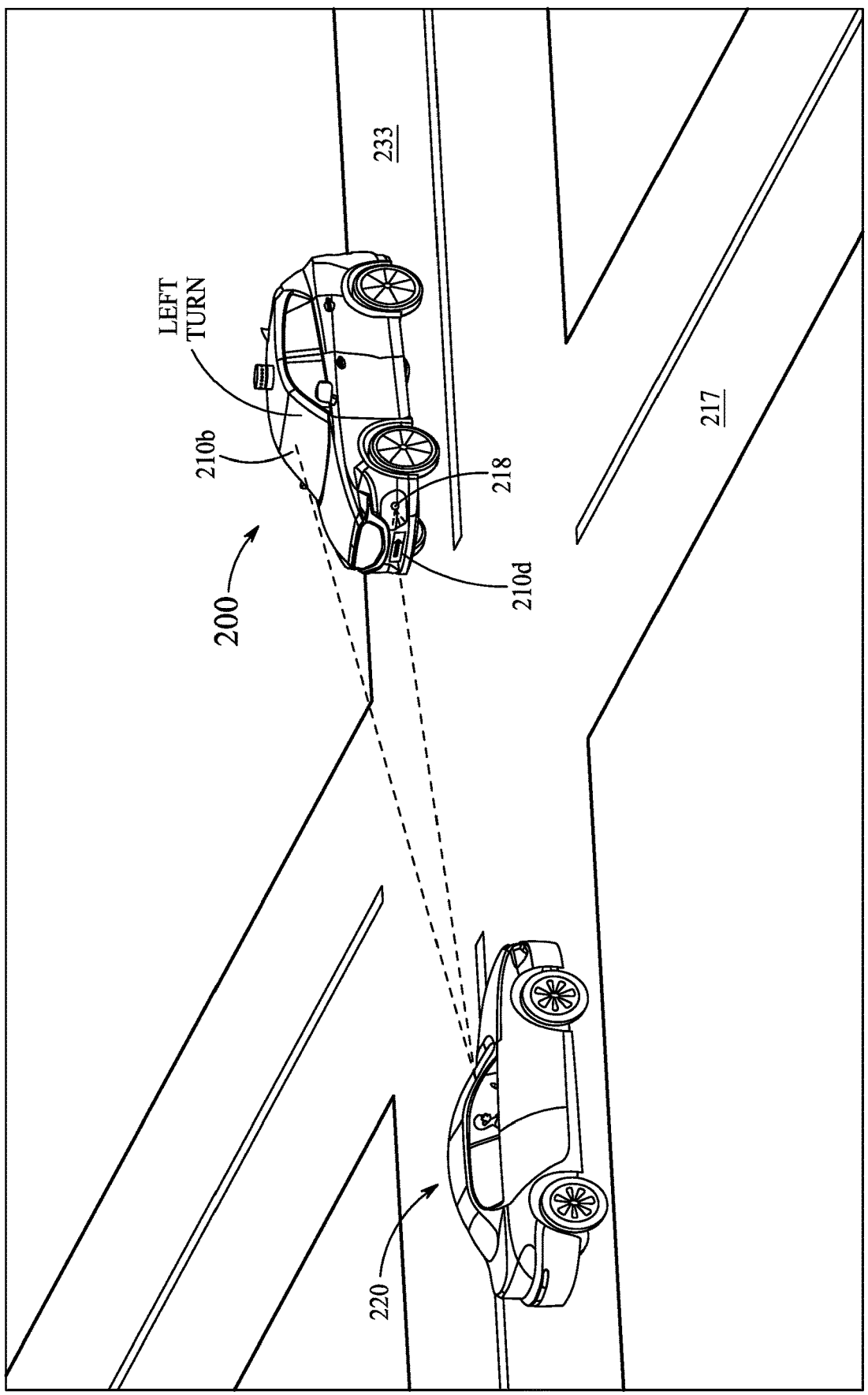
FIG. 2B is an illustration of a generalized autonomous vehicle approaching an intersection, according to certain embodiments.

As shown in FIG. 2B, an autonomous vehicle 200 is traveling on divided highway 233 and is approaching an intersection with divided highway 217. The autonomous vehicle 200 intends to make a left turn onto highway 217. A non-autonomous vehicle 220 is also approaching the intersection of highway 217 from the opposite direction. In this situation, determination of the gaze detection of the driver of the non-autonomous vehicle may not be possible due to glare on the windshield. The image processor of the autonomous vehicle may first run a glare compensation routine to remove the glare and secondly determine the head position of the driver. The computing system may predict the trajectory and likelihood of collision with the approaching vehicle 220 and, based on the windshield position, display the eHMI in a location deemed to be most viewable by the driver of the approaching vehicle. The driver of the non-autonomous vehicle may not be aware of the intention of the autonomous vehicle to make a left turn. The autonomous vehicle recognizes the field of view of the driver from the gaze direction or the windshield position of vehicle 220 and may display an eHMI notification 210*d* as a left turn arrow symbol on its front grill and an eHMI notification 210*b* as text (e.g., "Left Turn") on its front window in addition to a left turn signal 218.

In FIG. 2B, if vehicle 220 were a "connected" non-autonomous vehicle capable of receiving messages from other "connected" vehicles, such as autonomous vehicle 200, there would be no need to display the eHMI as vehicle 220 could receive an electronic intent notification through vehicle to vehicle communication (V2V) channels from vehicle 200.

The text and symbols described above are not limited and can be any text or symbol that can fit on the display. However, a display for broadcasting an eHMI notification may be the most effective when it is able to display both a symbol and text.

The eHMI communication device may be configured to display different colors, patterns, messages, or other visual data. The notification devices may also include a display device, such as an LCD or LED panel, a speaker configured to play audible messages, a windshield or window projector configured to cause visual data to be displayed on the windshield and/or windows of an autonomous vehicle, and/or a translucent display applied to, or replacing, one or more windows/windshields of the autonomous vehicle. Windshield projectors may map the eHMI to external positions in front of the autonomous vehicle, while window projectors pointed towards side windows may generate displays on the left and right sides of the autonomous vehicle.

Figure 3:
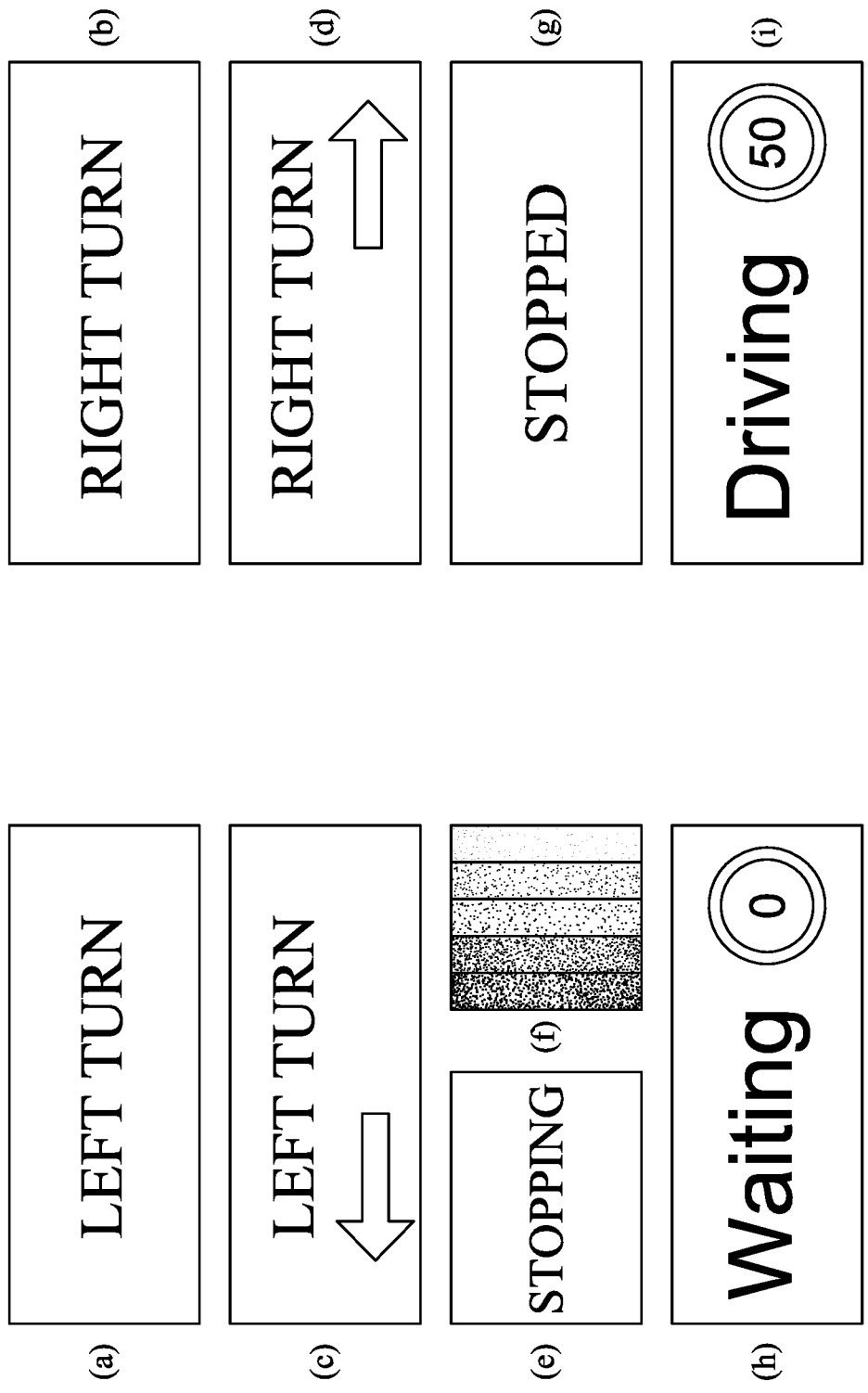
FIGS. 3(a)-(i) illustrate exemplary eHMI notifications of a) "Left Turn" text, b) "Right Turn" text, c) "Left Turn" text with a left arrow, d) "Right Turn" text with a right arrow, e) "Stopping" text, f) light bars, g) "Stopped" text, h) "Waiting" text and a speed symbol, i) "Driving" text and a speed symbol, according to certain embodiments.

As shown in FIG. 3(a-i), an eHMI notification may include text or text and a symbol, such as a) "left turn" b) "right turn", c) "left turn" plus a left turn arrow, d) "right turn" plus a right turn arrow, e) "Stopping", f) light bars of different colors or intensity to show the speed of the vehicle, g) "Stopped", h) "waiting" and a symbol indicating that the vehicle is at zero speed, i) "driving" and the vehicle speed. The eHMI notification may further include brake light patterns, flasher patterns, or the like, combined with text, such as "Stop", "Waiting", "Driving", "Braking", "Turning Left", "Turning Right" or the like.

Although the autonomous communication device is shown in a single system, the autonomous communication device may be distributed across multiple systems and/or integrated into an autonomous vehicle controller. Additionally, the eHMI notification processing may be performed by any number of different computers and/or systems. Thus, modules performing different parts of the programming may be separated into multiple services and/or over multiple different systems to perform the functionality described herein.

An autonomous vehicle may include a guidance system which makes use of the cameras, LiDAR scanners and/or radar images to determine images of the surrounding environment and moving objects. The autonomous vehicle may also connect in a mesh network with nearby autonomous vehicles to determine their trajectories, intentions to change trajectory and moving objects sensed in their surroundings. The guidance system may include an image analysis module which can use camera images, 3D point cloud and radar data to stitch together a representation of the surroundings of the autonomous vehicle. Movement within the surrounding environment can include current traffic and roadway conditions, nearby entities, autonomous vehicle status (e.g., speed, direction, etc.), and other data. Object recognition and computer vision techniques may be applied to the image data to identify road users, such as pedestrians, bicyclists and non-autonomous vehicles, as well as intersections and crosswalks.

For example, the sensors may provide sensor data from at least one of the cameras, LiDAR scanners, radar sensors, and the like, which may be used to form images of the surrounding environment. As an example, a road user head pose, body posture and trajectory estimator 787 (see FIG. 7) may derive a depth map and appearance information (such as color contrasts, intensity, etc.) from the sensor data, and detect pedestrian candidate regions (such as via a bounded point cloud input of LIDAR-based sensor devices, image recognition via imaging-based sensor devices, etc.) based on a comparison with human shape models to render a detected pedestrian object, and position relative to the autonomous vehicle 100. As may be appreciated, various object recognition methods may be used alone and/or in combination, such as an alignment methodology (e.g., using points, smooth contours, etc.), invariant properties methodology in which properties may be common to multiple views (e.g., color indexing, geometric hashing, moments, etc.), parts decomposition methodology (e.g., objects having natural parts, such as nose, eyes, mouth) for facial recognition, etc.

Other forms of human recognition may be implemented, such as via gaze tracking, eye tracking, etc. Generally vehicle sensor devices may operate to provide non-contact measurement of human eye motion. As may be appreciated, light waveforms (such as infrared frequency range), may be reflected from the eye and sensed by optical sensor, for example a video sensor device.

The computing system may perform gaze detection by running windowed convolutions matching typical gaze patterns on the detected facial area to indicate when a face of a human traffic participant may be directed towards the vehicle. Once a person's eyes are located, a sufficiently powerful camera may track the center of the pupil to detect gaze direction. Also, additional facial features may be included, such as eyebrow position, hairline position, ear position, etc. Such features may also be based on gaze recognition examples through machine learning based techniques (for example, convolutional neural networks, HOG detectors, random forests, support vector machines, etc.). Autonomous vehicle systems for eye tracking and gaze detection of a pedestrian, bicyclist or other road user are described further in US2018276986A1, incorporated herein by reference in its entirety.

As may be appreciated, vehicle sensors may operate to locate the point of a human traffic participant's gaze, and track movement of the point-of-gaze. Such tracking may take place in open air environments and/or environments in which a gaze source may be behind vehicle windows, tints, eyeglasses, contacts, etc. Further granularity may be achieved through eye-tracking, in which upon detection of a point-of-gaze, motion of an eye relative to the head may be determined to detect the attention level of a road user to the autonomous vehicle.

Each road user identified as being on a common, intersecting or colliding trajectory of the autonomous vehicle may be associated with one or more of the eHMI notifications. For example, a pedestrian may be associated with a crossing notification, while a cyclist or other non-autonomous vehicle may be associated with a vehicle action notification. The eHMI notification generator can retrieve a message from vehicle memory appropriate for the movements of the road user and provide the eHMI to the eHMI display within the field of view of the road user, based on the gaze direction of the road user or predicted trajectory of the road user and autonomous vehicle.

The eHMI notification may be displayed on the vehicle at a plurality of external positions and the messages displayed may be targeted to different road users. For example, there may be several pedestrians, each with different fields of view directed at different locations of the vehicle.

In an aspect of the present disclosure, an autonomous vehicle includes an eHMI notification system which uses sensing devices which monitor an external environment in which the vehicle is located. Monitoring the external environment can include generating sensor data which includes information regarding the external environment. For example, an autonomous vehicle may include one or more cameras which generate images of one or more portions of the external environment, a light beam scanning device which generates one or more point clouds of one or more portions of the external environments and a radar device which generates radar data associated with one or more portions of the external environment.

The autonomous vehicle includes a plurality of eHMI notification displays which are coupled to various portions of an exterior of the vehicle and are configured to display one or more messages generated by the computing system of the vehicle. The displays may be liquid crystal display (LCD) screens, light-emitting diodes (LED) screens, a combination of a screen and a projector, or a roof top projector configured to project an image on the road surface. Headlights, brake lights, back-up lights and turn signals may also be in conjunction with the eHMI notifications used to convey the intent of the autonomous vehicle. The displays may be configured for adjustable positioning in order to display the message in the field of view of the road user.

A message displayed may be a warning associated with a prediction that the trajectories of the road user and autonomous vehicle may intersect. For example, when the road user is a pedestrian that is walking along a sidewalk proximate to the autonomous vehicle, a warning may be displayed on the left or right door panel of the vehicle to alert the pedestrian to avoid turning into the roadway along which the autonomous vehicle is being navigated.

The computing system includes a processor including an environment mapping module and a trajectory prediction module which are configured to predict a trajectory of a road user through the environment based on identifying various contextual cues associated with the road user. In an example, if the road user is a pedestrian, the environment mapping module may use the location, head pose, walking speed, eye tracking, body posture, and the like, to identify the gaze direction. The environment mapping module may access a database of stored sets of images associated with poses, body posture, walking speeds, and the like, and may match each stitched image to a stored image to determine the gaze direction. The trajectory prediction module may predict the trajectory of the road user from the gaze direction, location, speed and other body cues.

Similarly, if the road user is a bicyclist, the environment mapping module may use the location, head pose, speed, body posture, and the like, to identify the gaze direction. The environment mapping module may access a database of stored sets of images associated with poses, body posture, speeds, and the like, and may match each stitched image to a stored image to determine the gaze direction. The trajectory prediction module may use the gaze direction to predict a trajectory of the bicyclist and the field of view of the bicyclist.

In a third example, if the road user is a non-autonomous vehicle, the environment mapping module may or may not be able to identify the gaze direction of the driver. Glare compensation of the images may be performed to identify at least some contextual cues, such as head pose, of the driver. If no contextual cues of the driver can be distinguished, the environment mapping module may use stitched images of the windshield orientation as the gaze direction. The trajectory prediction module may use the windshield orientation to predict a field of view of the non-autonomous vehicle, and display an appropriate eHMI notification on a display within the field of view.

Depending on the gaze direction and predicted trajectory of the road user, an eHMI module can select a display or set of displays and/or speakers on which to provide an eHMI notification.

As shown in FIG. 2A, where the eHMI module identifies a pedestrian ($242_1$ or $242_2$) in the external environment of the roadway, where the "standard" external positions of the autonomous vehicle are determined to be outside or in a narrow field of view of the pedestrian, the eHMI module can, in response to the identification, generate a notification on a display within the field of view of the pedestrian, based on the body posture, head position and gaze direction of the pedestrian. The eHMI can select a set of standard and non-standard display devices and/or speakers which can collectively generate the notification at an axis and angle into the field of view determined from the pedestrian's gaze direction. The eHMI module can determine the content of the notification, and command the set of standard and non-standard displays to generate the notification. The field of view may be defined as the number of degrees that can be seen by the viewer when the eye position is fixed. In humans, this angle is about 114 degrees horizontally, centered about the fixed eye position. Thus, gaze direction defines the field of view of the pedestrian, bicyclist or non-autonomous vehicle driver.

In a non-limiting example, the gaze direction of a road user may not be directed towards the autonomous vehicle. In this situation, the eHMI module may generate an audible signal through a speaker or the vehicle horn to alert the road user. When the environment mapping module determines that the gaze direction of the road user is directed towards the autonomous vehicle, the eHMI module will determine which display or set of displays should generate the eHMI notification. For example, if the autonomous vehicle is entering an intersection and making a left turn, the eHMI module may actuate the left turn signal, provide an eHMI on the left side of the vehicle to alert a pedestrian such as "Entering Intersection", provide an eHMI on the front windshield to alert on-coming traffic such as "Left Turn", and provide an eHMI on a rear view window or the rear bumper to alert following vehicles such as "Slowing and Turning Left". The eHMI notification may include a symbol as well as text. The symbol may be a left turn arrow, a red braking symbol or a speed notification, such as 10 mph, 20 mph, or the like. The eHMI notification can be displayed in color or in patterns of flashes. The eHMI notification may be presented as in a series of display sizes, such as small to large or large to small, to indicate speed of the autonomous vehicle or to improve the ability of the road user to see the notification. For example, an autonomous vehicle may display the eHMI message on a 360° display on the roof of the vehicle as a large left turn arrow when the autonomous vehicle is at a distance from the road user at which it would be difficult to read text. The size of the arrow may diminish as the autonomous vehicle approaches the road user and be augmented by a text message.

The environment mapping module uses pedestrian state estimation to make use of the physical position, head pose, body posture and gaze direction detected from the images of the pedestrian's body. The trajectory module tracks the oscillatory motion of body parts such as legs and hands to determine the trajectory of a pedestrian. Features including stepping frequency and step length are extracted from the pedestrian leg motion. These features are then used for estimating the current actions of the pedestrian. A sequence of actions is used to estimate the intention of the pedestrian. The probability of these intentions includes walking, standing, starting and stopping.

Various approaches exist to measure and detect road users. One conventional method is to use vehicle sensors, such as cameras, LiDAR and radar to detect and track road users and localize them in a global model. The global model contains information about the environment and the system that is necessary for the proper autonomous operation. The global model may also incorporate vehicle to vehicle (V2V) information from other connected, semi-autonomous or fully autonomous vehicles in defining the global model.

For example, in FIG. 2B, if non-autonomous vehicle 220 has a V2V communication system, vehicle 220 and autonomous vehicle 200 may communicate with one another and no eHMI notification would be needed.

In an aspect of the present disclosure, after localizing the road users, an environment mapping module incorporates a global model and then focuses on determining the gaze direction, wherein the trajectory module predicts the future path of the road user.

The eye orientation or gaze direction of the road user may be extremely helpful in determining the future actions of the road user. A road user who notices the autonomous vehicle and can view the eHMI notifications can make an informed decision as to his/her future actions.

Figure 4A:
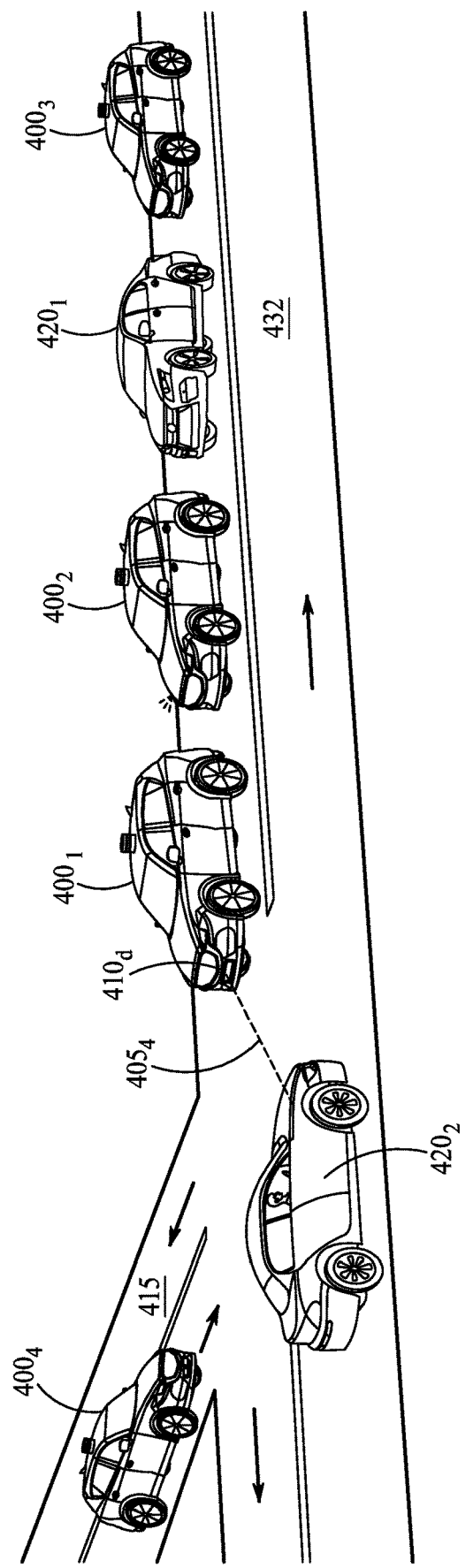
FIG. 4A is an illustration of an autonomous front vehicle displaying eHMI notifications for a line of vehicles, according to certain embodiments.

In a further aspect of the present disclosure illustrated in FIG. 4A, the system may determine that the optimal external position of the eHMI is on an external portion of another autonomous vehicle within the field of view of the road user, non-autonomous vehicle $420_2$. The autonomous vehicle may negotiate with the other autonomous vehicle to broadcast the eHMI to the road user. For example, a front autonomous vehicle $400_1$ in a long line of connected vehicles (a vehicle having an onboard communications system which is capable of transceiving over EDGE, 3G, 4G, 5G and LTE/LTE-A wireless cellular systems is known as a "connected vehicle") may broadcast the vehicle intent of all the vehicles in the right lane of roadway 432. In particular, the front autonomous vehicle $400_1$ may be a large vehicle that is substantially blocking the other vehicles in the lane from being viewed by the road user $420_2$. The other autonomous vehicles ($400_2$, $400_3$, $400_4$) can communicate their eHMIs (e.g., left turn, right turn, straight, stopping, speed, etc.) to the front vehicle so that the front vehicle can display all the eHMI notifications to the road user (non-autonomous vehicle $420_2$). In other words, the connected vehicles work together to determine road user occlusions and the best external position and vehicle on which to broadcast the eHMI of the group.

In particular, an autonomous vehicle may communicate with nearby vehicles in a mesh network to facilitate vehicle-to-vehicle communication. Each vehicle may communicate its trajectory or intent to change direction to the autonomous vehicle which acts as cluster head. The autonomous vehicle may correlate the information from the nearby vehicles to determine the "best" or most effective external position to broadcast its intentions to another road user by means of an eHMI notification. The "best external position" of the eHMI is not necessarily located on the autonomous vehicle, but instead the autonomous vehicle may instruct a nearby vehicle in the field of view of the road user to display the eHMI.

Figure 5B:
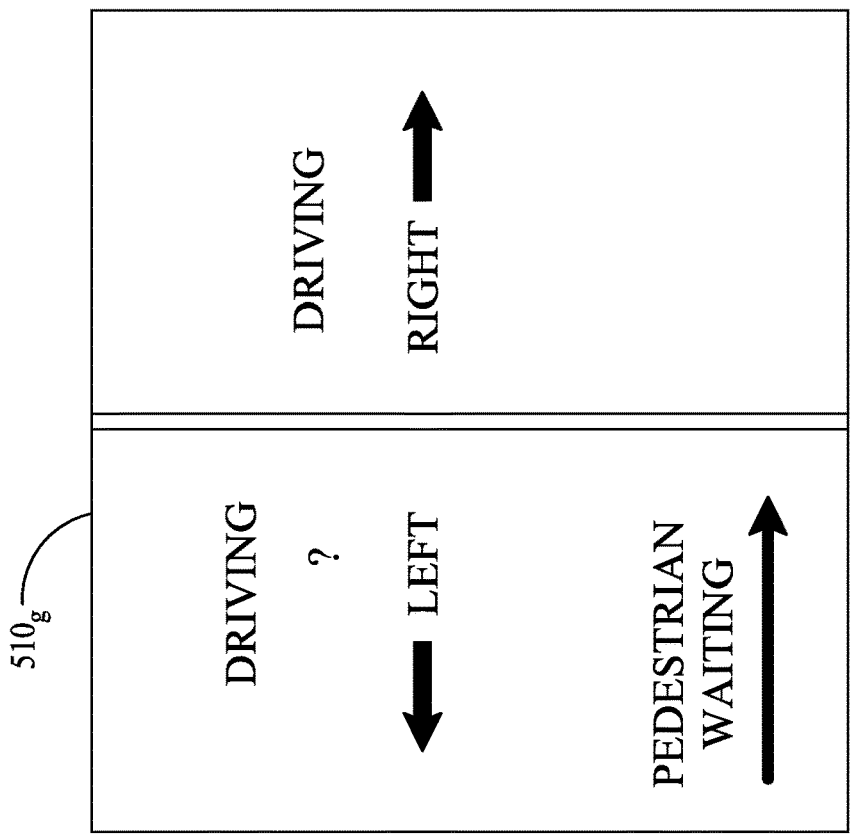
FIG. 5B is an example of a group eHMI notification for a double lane of traffic.
Figure 5A:
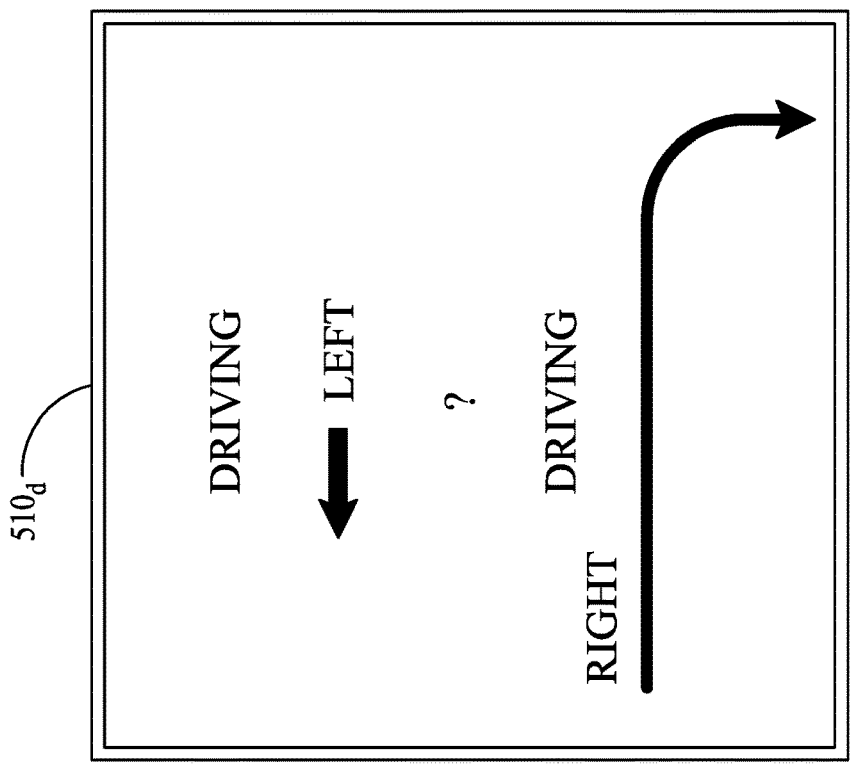
FIG. 5A is an example of a group eHMI notification for a single lane of traffic.

FIG. 5A illustrates an example of a group eHMI notification $510_d$ which may be displayed on a front grill of front vehicle $400_1$ for the situation shown in FIG. 4A. In this situation, non-autonomous vehicle $420_2$ may not able to see the turn signal indicators or eHMI displays of the line of vehicles. Based on the gaze direction of the driver of non-autonomous vehicle $420_2$ computed by the computing system of autonomous vehicle $400_1$, the eHMI notification is displayed on the front grill of vehicle $400_1$. The display lists the driving through action of the first autonomous vehicle $400_1$ at the top of the display, the right turn intent of the second autonomous vehicle $400_2$, a question mark for non-autonomous vehicle $420_1$, and the intention of autonomous vehicle $400_3$ to drive through the intersection. Also shown on the group display is the intention of autonomous vehicle $400_4$ located on side street 415 to make a right turn onto the roadway 432.

Figure 4B:
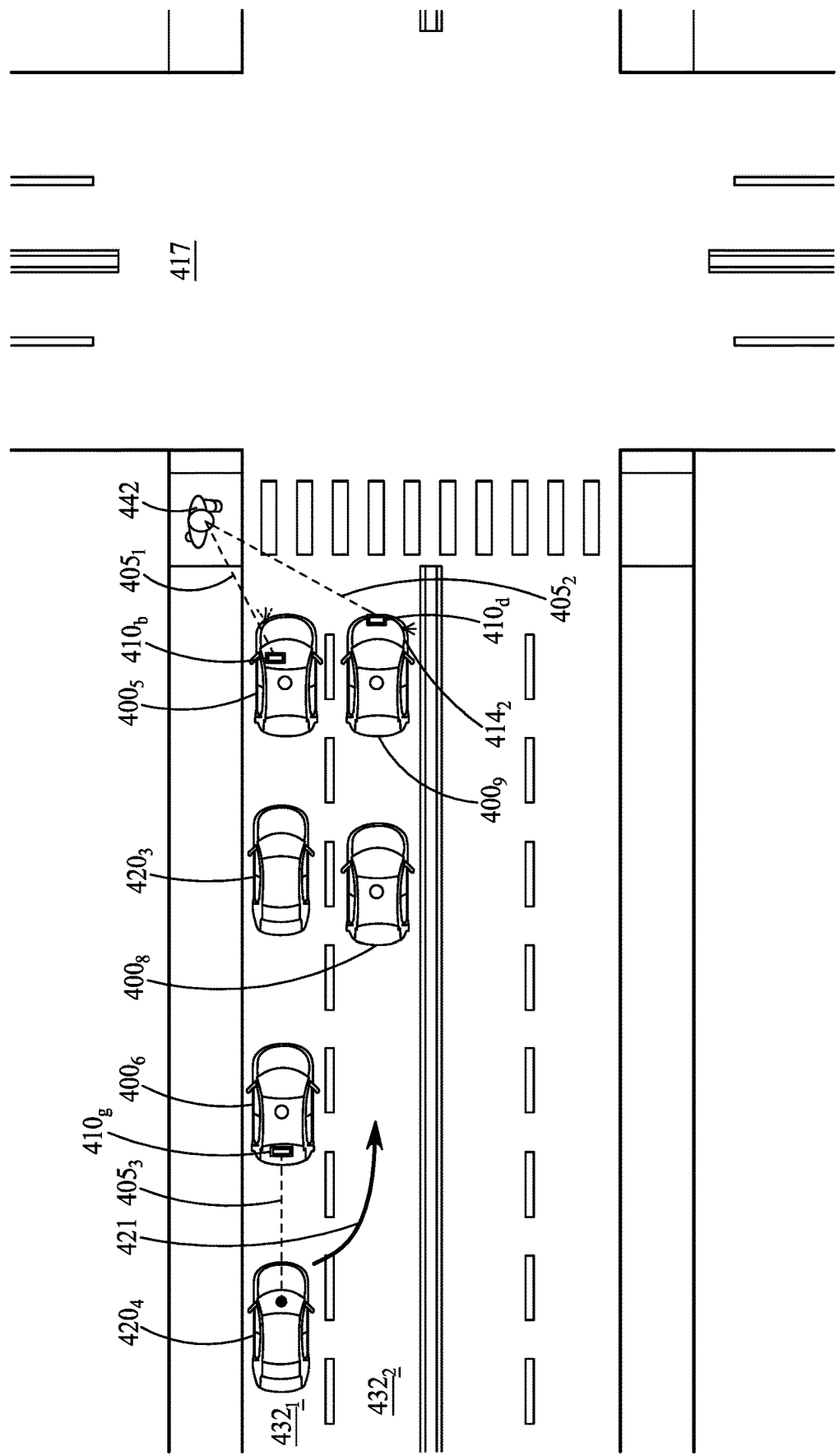
FIG. 4B is an illustration of an autonomous front vehicle displaying eHMI notifications for a rear vehicle and to a pedestrian, according to certain embodiments.

FIG. 4B is an example of multiple eHMI notifications each shown to a different road user. In this example, a first road user is non-autonomous vehicle $420_4$ whose driver can only see the rear of autonomous vehicle $400_6$ and can also see autonomous vehicle $400_8$ at a distance. The driver of non-autonomous vehicle $420_4$ wants to switch to the right lane (see arrow 421). A first group eHMI notification, such as is shown in FIG. 5B, is displayed on the rear window at position $410g$ to inform the driver of the intents of the vehicles ahead.

A second road user, pedestrian 442, is poised to walk across the roadway lanes $432_1$ and $432_2$ and has his gaze directed at the top of the front windshield of autonomous vehicle $400_5$ at position $410_b$ to view a second group eHMI notification. The second road user 442 could also view, at an acute angle, a third group eHMI notification on the front grill at position $410_d$ of autonomous vehicle $400_9$. However, the best location for the second group eHMI notification is on the front windshield of vehicle 410b, and the third eHMI notification will be suppressed. The autonomous vehicles $400_5$ and $400_9$ are also shown using turn signals, indicating their intents to turn onto intersecting roadway 417, which turn signals may not be visible to the driver of non-autonomous vehicle $420_4$ or to pedestrian 442.

The group eHMI notification 410b may list the intents of the line of vehicles behind vehicle $400_5$ or all nearby vehicles on the roadway.

In FIG. 4B, the driver of non-autonomous vehicle $420_4$ may want to pass a line of vehicles in front of his/her vehicle on the right (see trajectory arrow 421) by moving into the right lane $432_2$. In this case, the driver of non-autonomous vehicle $420_4$ may be informed by the bumper or rear window group eHMI notification display on autonomous vehicle $400_6$ of the impending actions of the vehicles ahead so driver may decide whether or not to move into the right lane. The autonomous vehicle $400_6$ forms a mesh network with the nearby autonomous vehicles ($400_5$, $400_8$, $400_9$), which communicate their surroundings to vehicle $400_6$. Vehicle $400_6$ may not be able to "see" pedestrian 442, who may intend to cross in front of the vehicles on crossing street 434. However, vehicles $400_5$ and $400_9$ can determine the pedestrian's intent by analyzing his/her motion and gaze direction and communicate this information to vehicle $400_6$ to display on rear display 410g. Therefore, the position and intention of the pedestrian may also be shown on eHMI notification 410g.

In the situation of FIG. 4B, where one of the vehicles in the line of connected vehicles is a non-autonomous vehicle, the connected vehicles can detect this condition and, for example, display an "X" or "?" indicating an unknown vehicle intent for the non-autonomous vehicle.

FIG. 5B illustrates an example of a group eHMI notification $510_g$ placed on the rear window of a vehicle $400_6$ of FIG. 4B, which is travelling in front of non-autonomous vehicle $420_4$.

The eHMI group notifications shown in FIG. 1A-5B are exemplary only and can take any form as determined by design considerations, display size, viewer field of view, and the like.

Figure 6A:
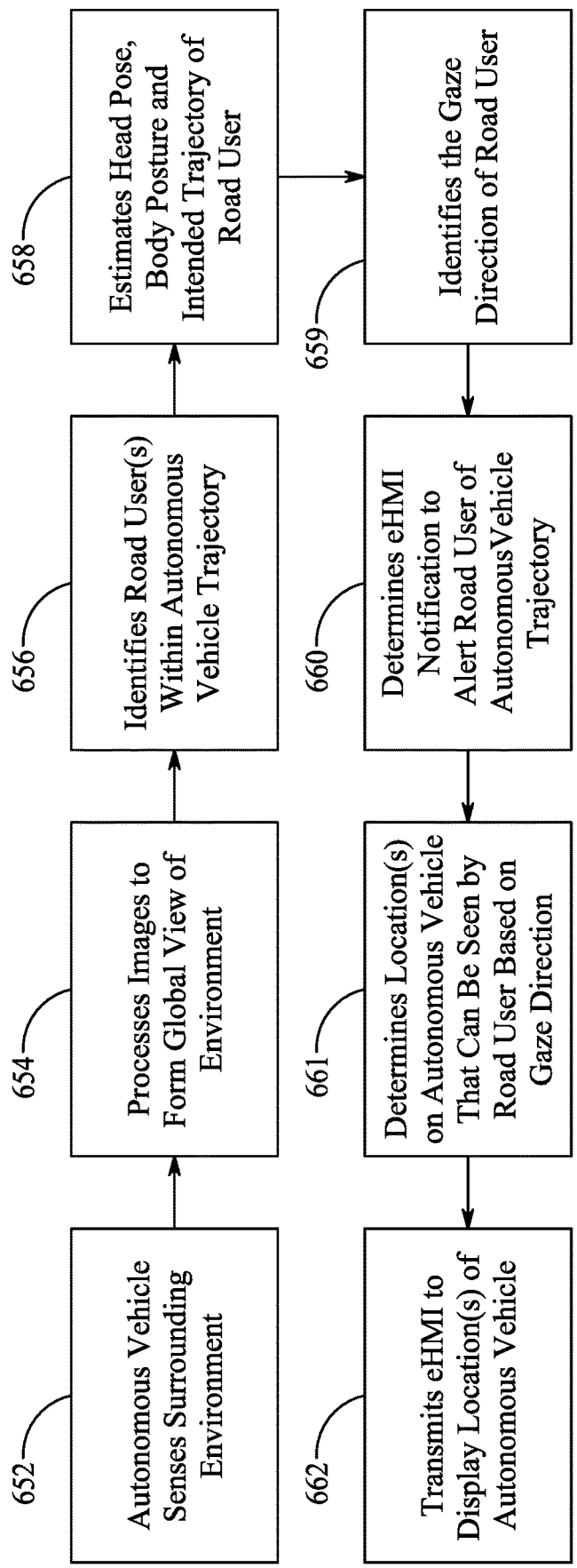
FIG. 6A is an exemplary flowchart of determining an eHMI external position for an autonomous vehicle, according to certain embodiments.

FIG. 6A is a flowchart of one aspect of the eHMI notification system of the present disclosure. In FIG. 6A, the flowchart starts at step 652, wherein the autonomous vehicle 100 senses the surrounding environment. The autonomous vehicle uses cameras (not shown), LiDAR 116 and radar (not shown) to detect features of the surrounding environment. These features may include the road surface, other vehicles, pedestrians, bicyclists, animals and objects in the surrounding environment. In step 654, an image processor 784 and environment module 786 (see FIG. 7) process the images to form a view of the environment. The view may be correlated with GPS information which shows roads, speed limits, the speed and direction of surrounding vehicles and any moving objects, such as people. At step 656, any road users which may intersect the trajectory of the autonomous vehicle within the same time period are identified, as these road users may collide with the autonomous vehicle. At steps 658-659, the head pose and body posture, changes in position or body posture are analyzed and correlated with eye positions to determine the gaze direction and field of view of the road user. An estimated intent of each road user to enter the immediate trajectory of the autonomous vehicle is predicted. In step 660, the eHMI notification module 791 (see FIG. 7) determines an appropriate eHMI notification to be displayed to alert each road user of the autonomous vehicle trajectory. At step 661, the eHMI display location determination module 792 (see FIG. 7) determines where on the autonomous vehicle the eHMI notification should be displayed, based on the field of view and gaze direction of the road user. At step 662, the eHMI notification is transmitted to the display location on the autonomous vehicle.

Depending on the location, road user trajectory, gaze direction of the road user, type of road user and estimated intent of the road user to intersect with the immediate trajectory of the autonomous vehicle, the eHMI notification may differ and may be displayed on a different external position of the autonomous vehicle. For example, as shown in FIG. 2A, the eHMI notification system may display the text "Stopping" as an eHMI notification on the top of the windshield at location 210b of autonomous vehicle 200 to alert pedestrian $242_1$ that the autonomous vehicle intends to stop at the crosswalk 234. The eHMI notification system may display a speed, such as 5 mph, on the front grill at location 210d to alert the pedestrian $242_1$ of its velocity. The eHMI notification system may display text indicating light bars which show a pattern indicating stopping on the right side door at location 210c of autonomous vehicle 200 and additionally, sound a horn or speaker to get the attention of pedestrian $242_2$ walking on sidewalk 230.

Figure 6B:
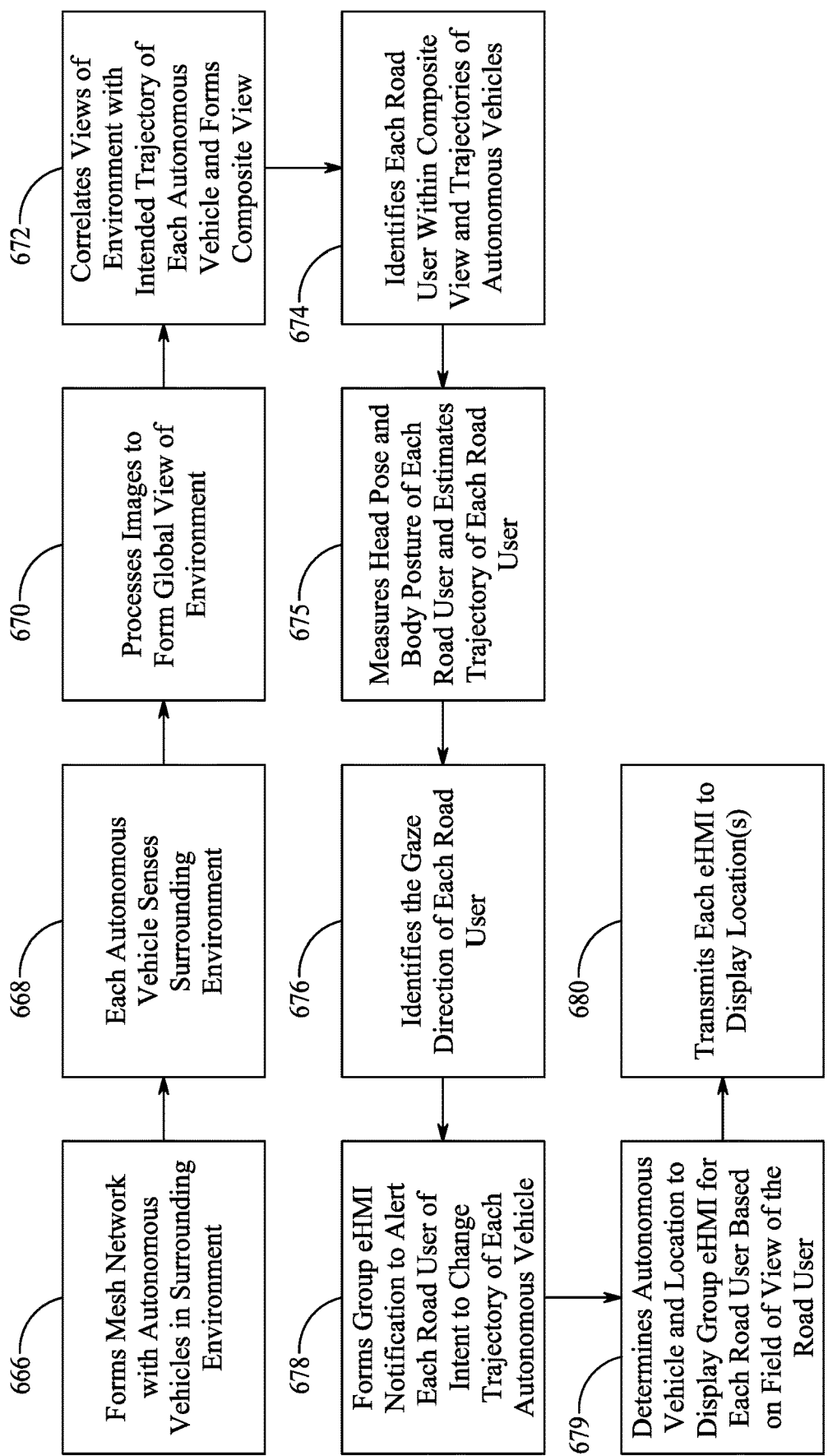
FIG. 6B is an exemplary illustration of determining a group eHMI external position for a plurality of autonomous vehicles, according to certain embodiments.

FIG. 6B illustrates a flowchart for determining a group notification for a plurality of vehicles, both autonomous and non-autonomous, travelling on a roadway. FIG. 4A and FIG. 4B show two examples of using a group eHMI notification. At step 666, an autonomous vehicle ($400_2$, for example) forms a mesh network with autonomous vehicles ($400_1$, $400_3$, $400_4$) in the surrounding environment. At step 668, each autonomous vehicle uses its cameras, LiDAR sensors and radar sensors to take images of the surrounding environment. At step 670, each autonomous vehicle processes the images (see image processor 784, FIG. 7) to form a view of the surrounding environment. At step 672, these views are transmitted to the cluster head (for example, autonomous vehicle $400_2$), which correlates these views with the trajectory of each autonomous vehicle to form a composite view. The cluster head performs the following steps: At step 674, the cluster head identifies each road user within the composite view and the trajectories of each autonomous vehicle and road user. At step 675, the head pose and body posture of the image of each road user is measured and consecutive images are examined to estimate the intent of the road user to enter a trajectory of one or more of the autonomous vehicles. At step 676, the gaze direction of each road user is determined by an eye tracker to assess on which autonomous vehicle an eHMI should be displayed and the most viewable display location for each road user. At step 678, the eHMI notification module 791 of the cluster head (see FIG. 7) determines the content of the eHMI notification to each road user. For example, the content may include one or more of text, symbols, signal lights, lighting patterns, sounds, and the like. At step 679, the eHMI location determination module 792 determines the "best" autonomous vehicle and a location on the "best" autonomous vehicle to display the eHMI notification for each road user. "Best location" and "best autonomous vehicle" are defined with respect to the widest field of view of the road user. At step 680, the eHMI notifications for each road user are transmitted to the "best" autonomous vehicle and a location on the "best" autonomous vehicle. In the example shown in FIG. 4A, autonomous vehicle $400_1$ receives an instruction from the cluster head to display a group eHMI notification (such as shown in FIG. 5A) on front grill display 410d, which falls within the gaze direction of non-autonomous vehicle $420_2$. This group notification shows the intent of each vehicle $400_1$, $400_2$, $420_1$ and $400_3$ to drive through, turn left, not known (non-autonomous vehicle $420_1$) or turn right. Also, vehicle $400_4$ has communicated its intent to turn left into the same lane as non-autonomous vehicle $420_2$ and this intent is displayed on the group notification placed on the front vehicle $400_1$ at position $410_d$.

Figure 7:
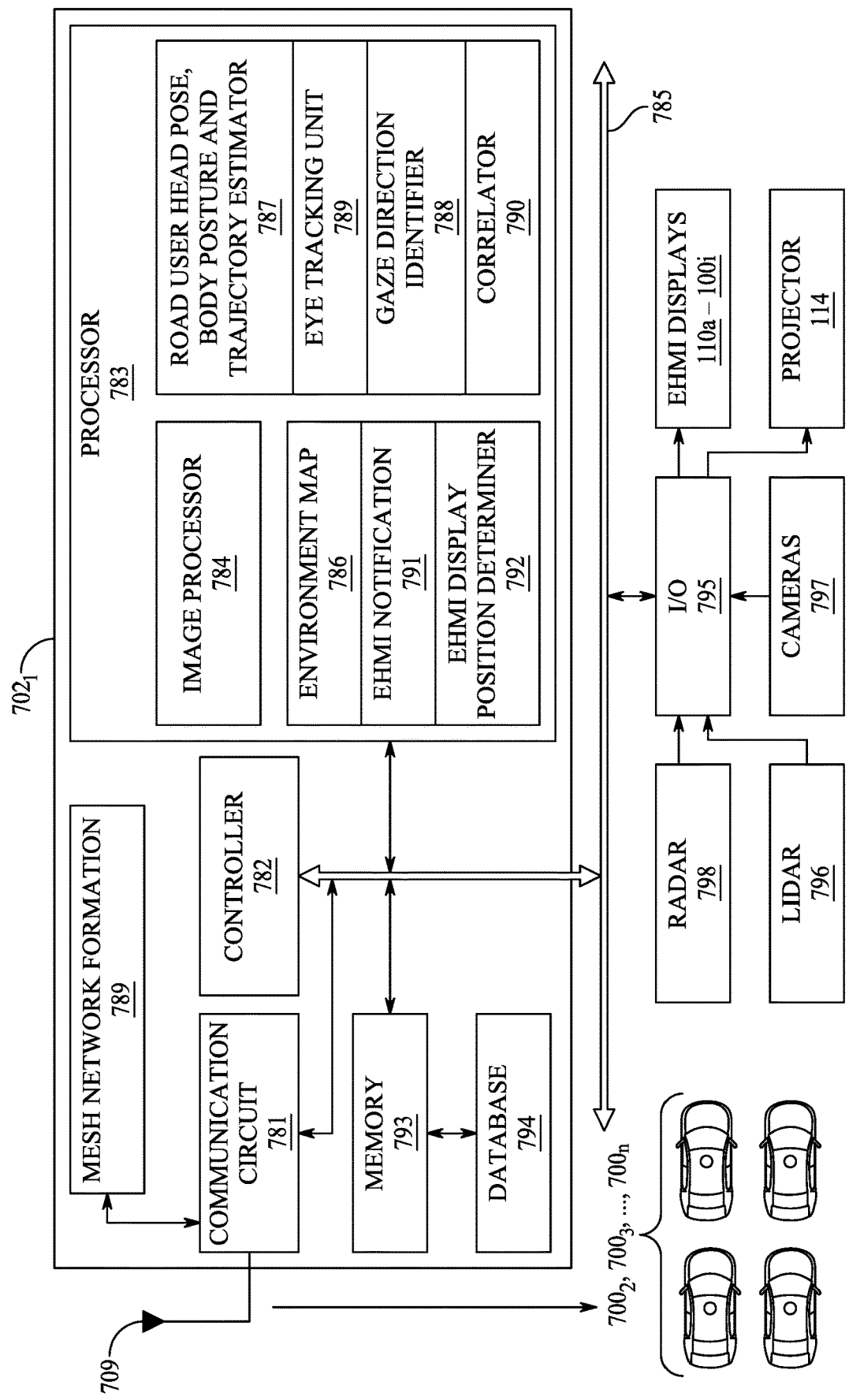
FIG. 7 is a block diagram of a computing system for determining an eHMI, according to certain embodiments.

FIG. 7 is a block diagram of the computing system $702_1$ of an autonomous vehicle $700_1$ equipped with the eHMI notification device. The computing system includes an antenna which is configured to communicate with N nearby autonomous vehicles ($700_2$, $700_3$, . . . , $700_n$, where N is the number of autonomous vehicles nearby autonomous vehicle $700_1$). The computing system further includes a controller 781, an image processor 784 and a processor 783 configured to operate the cameras, LiDAR sensors and radar sensors to image the surrounding environment. The computing system includes a memory storing program instructions which may be accessed by the image processor 784 and/or the processor 783. The image processor 784 includes circuitry configured to execute the program instructions to receive the images from the cameras, LiDAR sensors, timestamp the images and provide the timestamped images to the processor 783 for further analysis. The processor is configured to access the program instructions to perform aspects of the present disclosure. The processor is configured to perform environment mapping by using the timestamped images from the cameras, LiDAR sensors and radar sensors to form a view of the surrounding environment. The processor is configured with road user head pose, body posture and trajectory estimator 787 having program instructions configured to identify the road user and his/her body positions over a series of images. The processor is further configured with an eye tracking software unit 789 to determine eye positions from cameras which are configured as eye trackers. A gaze direction identifier 788 is configured to determine the gaze direction 788 of the road user(s) from the eye positions, the head pose and the body posture images taken by the cameras 797. The processor includes program instructions to perform mesh network formation 789 with the N nearby autonomous vehicles. The autonomous vehicle 700₁ operates as the cluster head in the mesh network. The choice of a cluster head is generally determined by the connectivity status of a vehicle, such a connected, a good connection, a poor data connection, or the like, the type of communication device in the vehicle (3G, 4G, 5G, etc.) and the amount of power available for communication. For example, an autonomous vehicle which is close to a recharge state would not act as the cluster head. The correlation module is configured to concatenate the views from each autonomous vehicle, correlate these views with the trajectories of each autonomous vehicle and each road user and identify the road users which would benefit from an eHMI notification. The eHMI determination module is configured to determine the notification to be sent to the road user from a plurality of messages stored in database 794 connected to memory 794. An eHMI display location determination module 792 is configured to identify the "best" autonomous vehicle to display the eHMI notification and the "best" external position on the autonomous vehicle based on the gaze direction of the road user.

The first embodiment is illustrated with respect to FIG. 1A-11. The first embodiment describes a method for displaying at least one external human-machine interface (eHMI) notification identifying a plurality of autonomous vehicles (see 400₁, 400₂, 400₃, 400₄, FIG. 4) travelling on a trajectory near at least one road user (242₁, 242₂, 220, 250, FIG. 2A and 420₁, 420₂, 420₃, 442, FIG. 4A, 4B), comprising receiving images (see LiDAR 796, cameras 797, radar sensors 798, FIG. 7), of an environment transmitted from the plurality of autonomous vehicles and receiving trajectory information from each of the plurality of autonomous vehicles (through communication module 781 and antenna 709, FIG. 7), stitching together the images to form a global view of the environment (786, FIG. 7), correlating (790, FIG. 7) the global view with the trajectories of each of the plurality of autonomous vehicles, identifying a road user in the global view of the environment, determining a gaze direction of the road user, determining an intent of the road user to intersect with one or more of the trajectories (787, FIG. 7), generating an eHMI notification (791, FIG. 7) which includes at least one of a message and a symbol (see FIG. 3) indicating the trajectory of at least one of the plurality of autonomous vehicles, and displaying the eHMI notification on an external display (110a-110i, FIG. 1A, 1B, 1C) of an autonomous vehicle which is within an unoccluded field of view of the road user based on the gaze direction.

The method includes generating an eHMI notification which includes both text and a symbol (see FIG. 3c, d, h, i), wherein the received images of the environment are generated by at least one of a plurality of cameras 797, a plurality of LiDAR sensors 796 and a plurality of radar sensors 798, tracking an eye position of the road user and determining a gaze direction (see dotted lines, FIG. 2A) of the road user by analyzing at least one of a head pose, eye position and body posture of the road user, determining an intent of the road user to intersect with one or more of the trajectories by analyzing a plurality of successive images of the road user and identifying changes between the successive images which indicate motion of the road user towards one or more of the trajectories.

The method includes determining that the road user is one of a pedestrian (242₂, FIG. 2A) and a manually driven vehicle (for example, bicyclist 250₁, FIG. 2A), determining that the road user is travelling beside a common trajectory of the plurality of autonomous vehicles not within a forward gaze direction of the road user, determining which one of the autonomous vehicles is closest to the road user, generating a sound from the autonomous vehicle closest to the road user to alert the road user of an intent of at least one autonomous to cross the trajectory of the road user, determining the gaze direction of the road user and displaying the eHMI notification on a display location of the autonomous vehicle (i.e., side door (210c, FIG. 2A) or side window (110i, FIG. 1C) within the field of view of the road user.

The method further includes determining, from the global view, whether there are non-autonomous vehicles which are not visible to the road user (see 420₂, which cannot see eHMI notifications on vehicles 400₂ and 400₁, FIG. 4A), determining a trajectory (see 787, FIG. 7) for each non-autonomous vehicle, generating a group eHMI notification (FIG. 5A, 5B) which indicates the plurality of trajectories of the autonomous vehicles and the non-autonomous vehicles (indicated by "?" on FIG. 5A, 5B) on a common trajectory with the road user, and displaying the group eHMI notification on an eHMI display (410_d) of an autonomous vehicle (e.g., 400₁) which is within the field of view of the road user based on the gaze direction (e.g., 405₄).

The method additionally includes identifying the road user as a non-autonomous vehicle (e.g., 420₄, FIG. 4B) on a common trajectory with and travelling directly behind a front autonomous vehicle (e.g., 400₆), and displaying the group eHMI notification on a rear window eHMI display (e.g., 410g, FIG. 4B) of the front autonomous vehicle which is within the field of view of the road user based on the gaze direction (e.g., 405₃).

The method further additionally includes identifying the road user as a non-autonomous vehicle (e.g., 420₂, FIG. 4A) travelling on a trajectory opposite the common trajectory of the plurality of autonomous and non-autonomous vehicles, and displaying the group eHMI notification on a front grill (410_d) of the autonomous vehicle located at a position of the common trajectory nearest the road user and within the field of view of the road user.

The method still further includes identifying the road user as a pedestrian (e.g., 242₁, FIG. 2A) walking on a street 234 which crosses the common trajectory (232₁, 232₂), and displaying the group eHMI notification on at least one of a front window (210_b) and a front grill (210_d) of the autonomous vehicle located at a position of the common trajectory within the field of view of based on the gaze direction (see dotted lines, FIG. 2A) of the road user.

The second embodiment is illustrated with respect to FIG. 1A-FIG. 11. The second embodiment describes a system for displaying at least one external human-machine interface (eHMI) notification to a road user, comprising an autonomous vehicle (200, FIG. 2A) having a plurality of eHMI notification displays (110a-110i, FIG. 1A, 1B, 1C) located at different external positions on the autonomous vehicle, wherein the plurality of notification displays are configured for independent activation, a plurality of sensors see LiDAR 796, cameras 797, radar sensors 798, FIG. 7) configured to generate images of the surrounding environment, an eye tracking unit configured to track the eye positions of the road user, a computing device 702 operatively connected to the plurality of notification devices and the plurality of sensors (see bus lines 785a, 785b), the computing device including circuitry and at least one processor (783) having programming instructions configured to determine the gaze direction of the road user based on the eye positions (788), a head pose and a body posture of the road user, determine a field of view of the road user based on the gaze direction, estimate the intent of the road user to move into the trajectory of the autonomous vehicle (788), and provide an eHMI notification (791, 792) on at least one of the plurality of eHMI notification displays (110a-110i, FIG. 1A, 1B, 1C) which is within an unoccluded field of view of the road user.

The plurality of sensors include at least one of a plurality of cameras (797), a plurality of LiDAR sensors (796) and a plurality of radar sensors (798) mounted on the autonomous vehicle.

The computing device includes an image processing circuitry (784) configured to timestamp the images, and an image analysis circuitry further configured to execute the program instructions to stitch together an environmental map (786) and the timestamped images to form a global view of the surrounding environment on the environmental map, identify a road user in the global view and estimate the intent of the road user to intersect with the trajectory of the autonomous vehicle by analyzing a plurality of successive images of the road user and identifying changes between the successive images which indicate motion of the road user towards the trajectory of the autonomous vehicle.

The system further includes communication circuitry (781) configured to identify nearby autonomous vehicles, transmit requests to the nearby autonomous vehicles to form a mesh network, form the mesh network upon receiving confirmation of the requests; request image sensor data, mapping data and trajectories from each of the nearby autonomous vehicles to be transmitted over the mesh network, receive the image sensor data, mapping data and trajectories from the nearby autonomous vehicles, wherein the processing circuitry is further configured to combine the image sensor data and the mapping data of the nearby autonomous vehicles and correlate (in correlator 790) the global view with the image sensor data, the mapping data, the trajectories of each of the nearby autonomous vehicles, the road user, the gaze direction of the road user, and the estimated intent of the road user.

The computing device further includes a database (794) storing a plurality of eHMI notification messages and a plurality of external display positions for each autonomous vehicle, and an eHMI notification module (791) configured to analyze the combined global view and retrieve an eHMI notification for each road user from the database and an eHMI display position determination module (792) configured to analyze the combined global view, the eHMI notification for each road user and the gaze direction of each road user to determine at least one external display position on an autonomous vehicle which is within the field of view of each road user, and transmit (by communication module 781) the eHMI notifications and external display positions to the plurality of autonomous vehicles.

The computing device further comprises a database (794) storing a plurality of eHMI notification messages and a plurality of external display positions for the autonomous vehicle, an eHMI notification module (791) configured to analyze the global view and retrieve an eHMI notification for the road user from the database, an eHMI display position determination module (792) configured to analyze the global view, the eHMI notification for the road user and the gaze direction of the road user to determine at least one external display position on the autonomous vehicle which is within the field of view of the road user, and a controller (782) configured to transmit the eHMI notification to the external display position which is within the field of view of the road user.

The third embodiment is described with respect to FIG. 1A-11. The third embodiment describes a non-transitory computer readable medium having instructions stored therein that, when executed by one or more processor 783, cause the one or more processors to perform a method for displaying at least one external human-machine interface (eHMI) notification identifying a plurality of autonomous vehicles (see 400₁, 400₂, 400₃, 400₄, FIG. 4) travelling on a trajectory near at least one road user (242₁, 242₂, 220, 250, FIG. 2A and 420₁, 420₂, 420₃, 442, FIG. 4A, 4B), comprising receiving images (see LiDAR 796, cameras 797, radar sensors 798, FIG. 7), of an environment transmitted from the plurality of autonomous vehicles and receiving trajectory information from each of the plurality of autonomous vehicles (through communication module 781 and antenna 709, FIG. 7), stitching together the images to form a global view of the environment (786, FIG. 7), correlating (790, FIG. 7) the global view with the trajectories of each of the plurality of autonomous vehicles, identifying a road user in the global view of the environment, determining a gaze direction of the road user, determining an intent of the road user to intersect with one or more of the trajectories (787, FIG. 7), generating an eHMI notification (791, FIG. 7) which includes at least one of a message and a symbol (see FIG. 3) indicating the trajectory of at least one of the plurality of autonomous vehicles, and displaying the eHMI notification on an external display (110a-110i, FIG. 1A, 1B, 1C) of an autonomous vehicle which is within an unoccluded field of view of the road user based on the gaze direction.

The non-transitory computer readable medium method further includes determining the intent of the road user to intersect with one or more of the trajectories by analyzing a plurality of successive images of the road user and identifying changes between the successive images which indicate motion of the road user towards one or more of the trajectories.

The non-transitory computer readable medium method further includes determining, from the global view, whether there are non-autonomous vehicles which are not visible to a road user (see 420₂, which cannot see eHMI notifications on vehicles 400₂ and 400₁, FIG. 4A), determining a trajectory (see 787, FIG. 7) for each non-autonomous vehicle, generating a group eHMI notification (FIG. 5A, 5B) which indicates the plurality of trajectories of the autonomous vehicles and the non-autonomous vehicles (indicated by "?" on FIG. 5A, 5B) on a common trajectory with the road user, and displaying the group eHMI notification on an eHMI display (410d) of an autonomous vehicle (e.g., 400₁) which is within the field of view of the road user based on the gaze direction (e.g., 405₄) of the driver.

Figure 8:
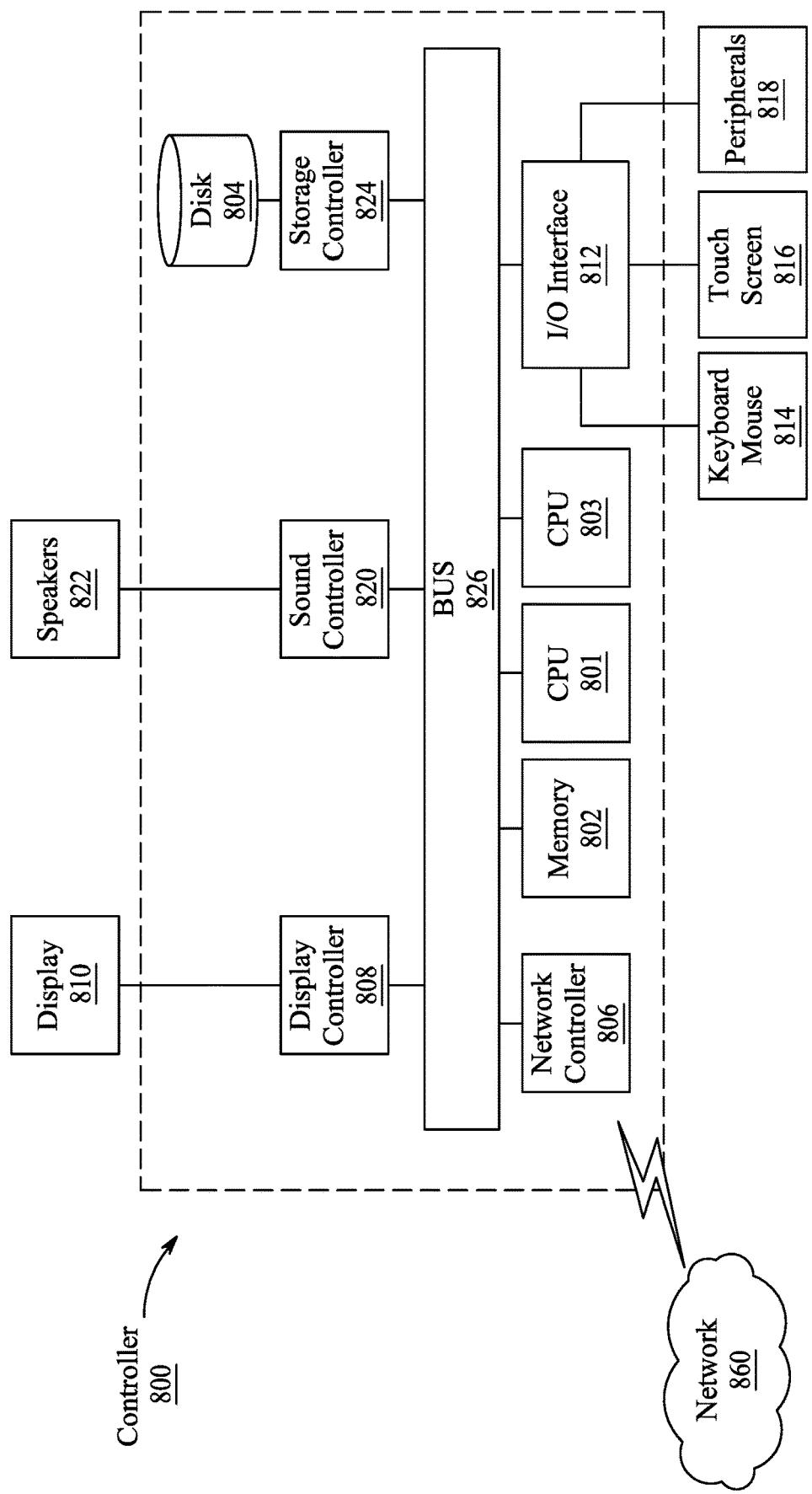
FIG. 8 is an illustration of a non-limiting example of details of computing hardware used in the computing system, according to certain embodiments.

Next, further details of the hardware description of the computing environment of FIG. 7 according to exemplary embodiments are described with reference to FIG. 8. In FIG. 8, a controller 800 is described is representative of the computing system of FIG. 7 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
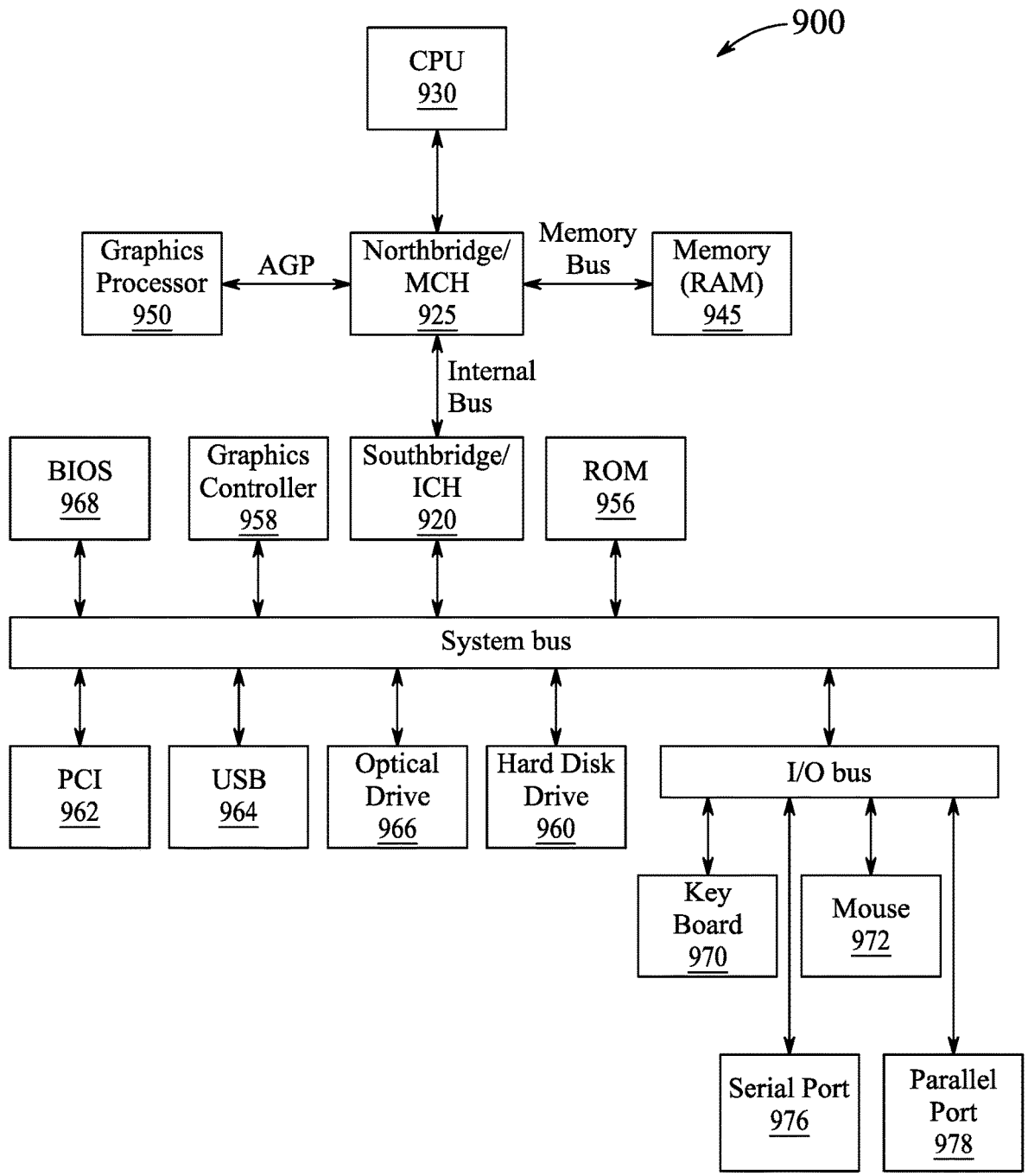
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
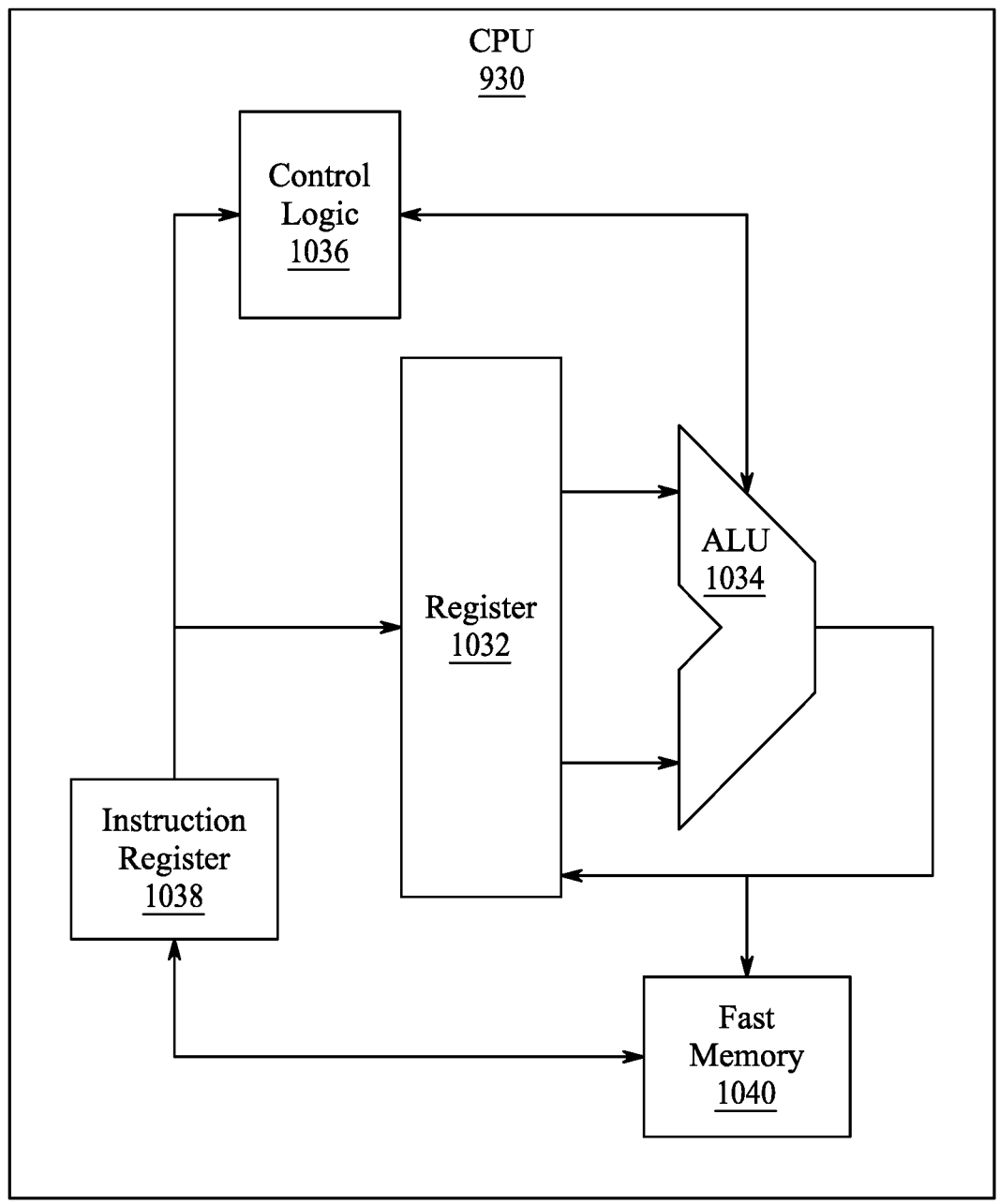
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
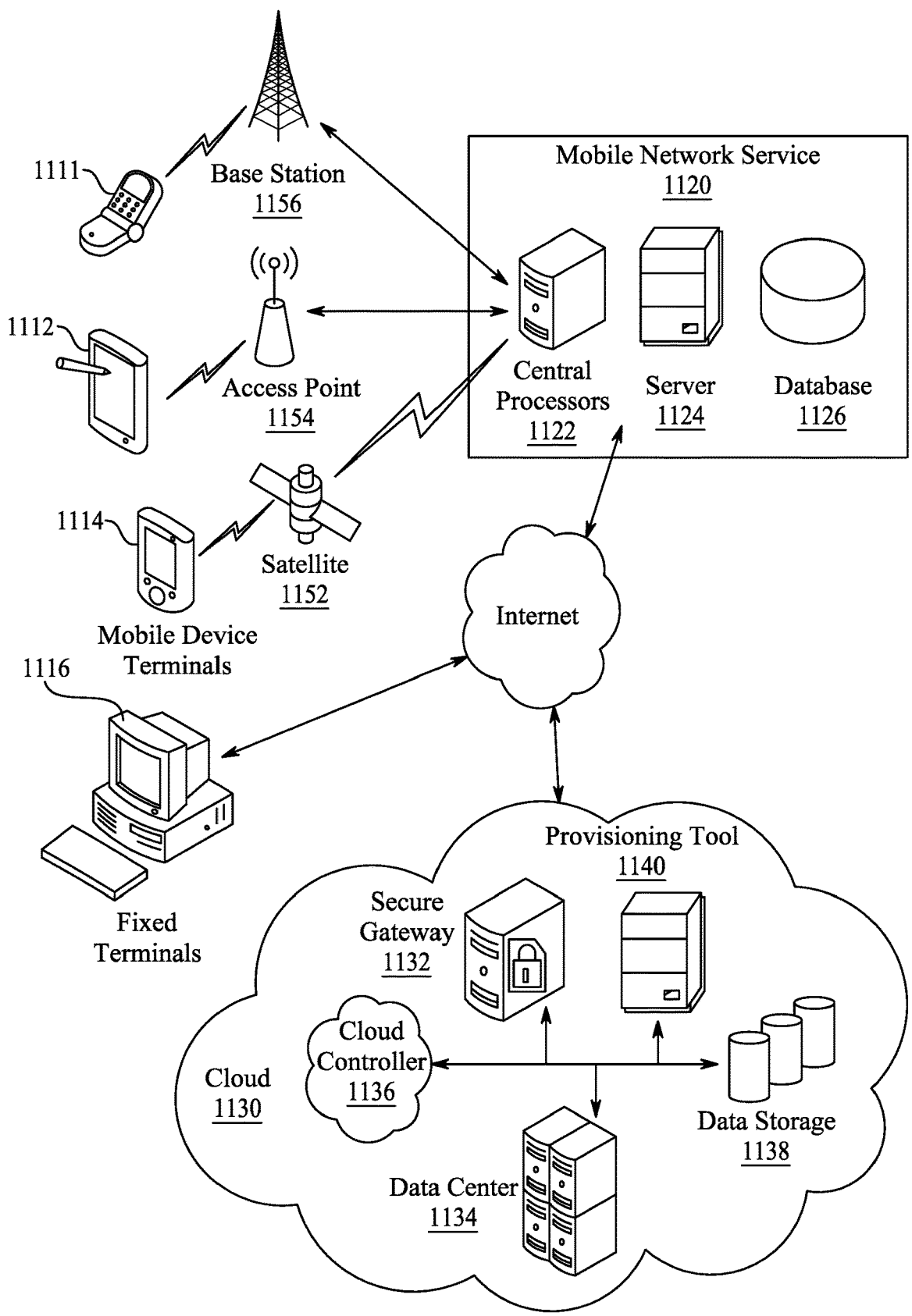
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for displaying by an autonomous vehicle, a group external human-machine interface (eHMI) notification to at least one road user, comprising:
recording, by one or more cameras, LiDAR sensors and radar sensors located within the autonomous vehicle, images of an environment surrounding the autonomous vehicle;
generating, by an image processor connected to the one or more cameras, LiDAR sensors and radar sensors, a global view of the environment based on the images;
detecting, by a computing device located within the autonomous vehicle and operatively connected to the image processor, whether there is at least one road user in the global view which is travelling on a trajectory which intersects a trajectory of the autonomous vehicle;
determining, by the computing device, a gaze direction of the at least one road user;
predicting, by the computing device, whether the at least one road user has an unoccluded view of an eHMI display located on the autonomous vehicle based on the gaze direction;
when it is predicted that the at least one road user has an unoccluded view of the EMHI display located on the autonomous vehicle, generating, by the computing device, an eHMI notification which includes at least one of a message and a symbol indicating the trajectory of the autonomous vehicle;
transmitting the eHMI notification to the eHMI display on the autonomous vehicle which is within the unoccluded view of the gaze direction of the at least one road user;
when it is predicted that the eHMI display of the autonomous vehicle is not within the unoccluded view of the at least one road user,
identifying, by the computing device, nearby autonomous vehicles within the global view;
requesting, by the computing device, that the nearby autonomous vehicles form a mesh network with the autonomous vehicle and designating the autonomous vehicle as a cluster head;
requesting, by the computing device, from each nearby autonomous vehicle, recorded images of the environment surrounding the nearby autonomous vehicle;
receiving, by the computing device, the recorded images from each nearby autonomous vehicle;
receiving, by the computing device, trajectory information from each of the nearby autonomous vehicles;
stitching together, by the computing device, the recorded images and updating the global view to form an updated global view of the environment;
correlating, by the computing device, the updated global view with the trajectory information of each of the nearby autonomous vehicles;
identifying, by the computing device, an eHMI display on one of the nearby autonomous vehicles which is within an unoccluded field of view of the road user based on the gaze direction of the road user;
generating a group eHMI notification which includes at least one of a message and a symbol indicating the trajectories of the autonomous vehicle and at least one of the nearby autonomous vehicles; and
transmitting, by the computing device, the group eHMI notification to the nearby autonomous vehicle having an eHMI display which is within an unoccluded field of view of the road user with a request to display the group eHMI notification on the eHMI display.

2. The method of claim 1, further comprising:
tracking, by an eye tracking unit located in the autonomous vehicle, an eye position of the road user;
estimating, from the updated global view, a head pose and a body posture of the road user; and
determining the gaze direction of the road user by analyzing at least one of the eye position, the head pose and the body posture of the road user.

3. The method of claim 1, further comprising:
determining, by the computing device, an intent of the road user to intersect with one or more of the trajectories of the autonomous vehicle and the nearby autonomous vehicles by analyzing a plurality of successive images of the road user and identifying changes between the successive images which indicate motion of the road user towards one or more of the trajectories.

4. The method of claim 1, comprising:
determining, by the computing device, that the road user is one of a pedestrian and a manually driven vehicle;
determining, by the computing device, that the road user is travelling beside a common trajectory of at least one of the autonomous vehicle and the nearby autonomous vehicles not within a forward gaze direction of the road user;
determining, by the computing device, which one of the nearby autonomous vehicles is closest to the road user;

determining, by the computing device, an intent of at least one of the autonomous vehicle and the nearby autonomous vehicles to modify its trajectory to intersect the trajectory of the road user;
transmitting, by the autonomous vehicle, a request to the nearby autonomous vehicle closest to the road user to generate a sound to alert the road user of the presence of the at least one of the autonomous vehicle and of an intent the nearby autonomous vehicles;
determining, by the computing device, a change in the gaze direction of the road user based on the sound;
identifying, by the computing device, an eHMI display on one of the nearby autonomous vehicles which is within an unoccluded field of view of the road user based on the changed gaze direction of the road user;
generating a group eHMI notification which includes at least one of a message and a symbol indicating the trajectories of the autonomous vehicle and at least one of the nearby autonomous vehicles which are travelling on the trajectory which intersects the trajectory of the road user; and
transmitting, by the computing device, the group eHMI notification to the nearby autonomous vehicle having an eHMI display which is within the unoccluded field of view of the road user with a request to display the group eHMI notification on the unoccluded eHMI display.

5. The method of claim 1, further comprising:
determining, by the computing device, from the updated global view, whether there are non-autonomous vehicles on the trajectory of the road user which are not visible to the road user;
analyzing, by the computing device, a plurality of successive images of the non-autonomous vehicles and identifying changes between the successive images which indicate a motion of the non-automonous vehicles as being on a common trajectory or an intersecting trajectory of the road user;
identifying, by the computing device, an eHMI display on a nearby autonomous vehicle which is within an unoccluded field of view of the road user based on the gaze direction of the road user;
generating, by the computing device, a group eHMI notification which indicates the trajectories of each of the autonomous vehicle, the non-autonomous vehicles and the nearby autonomous vehicles; and
transmitting the group eHMI notification to the nearby autonomous vehicle having the eHMI display which is within an unoccluded field of view of the gaze direction of the road user with a request to display the group eHMI notification on the unoccluded eHMI display.

6. The method of claim 1, comprising:
identifying, by the computing device, the road user as a non-autonomous vehicle on a common trajectory with and travelling directly behind a nearby autonomous vehicle;
transmitting, by the computing device, the group eHMI notification to the nearby autonomous vehicle directly in front of the non-autonomous vehicle with a request to display the group eHMI notification on a rear window of the nearby autonomous vehicle directly in front of the non-autonomous vehicle.

7. The method of claim 1, comprising:
identifying, by the computing device, the road user as a non-autonomous vehicle travelling on a trajectory opposite in direction to a common trajectory of the autonomous vehicle and the nearby autonomous vehicles; and non-autonomous
identifying, by the computing device, an eHMI display on one of a front window and a front grill of one of the nearby autonomous vehicles which is within an unoccluded field of view of the road user based on the gaze direction of the road user; and
transmitting, by the computing device, the group eHMI notification to the nearby autonomous vehicle with a request to display the group eHMI notification on the eHMI display located on one of the front window and the front grill which is within an unoccluded field of view of the road user.

8. The method of claim 1, comprising:
identifying, by the computing device, the road user as a pedestrian walking on a street which crosses the common trajectory;
identifying, by the computing device, a nearby autonomous vehicle having an eHMI display on a front window which is within the unoccluded field of view of the road user; and
transmitting the group eHMI notification to the nearby non-autonomous vehicle with a request to displaythe group eHMI notification on the eHMI display on the front window.

9. A system for displaying at least one external human-machine interface (eHMI) notification to a road user, comprising:
an autonomous vehicle having a plurality of eHMI displays located at different external positions, wherein the plurality of eHMI displays are configured for independent activation;
a plurality of sensors configured to generate images of the surrounding environment;
an image processor configured to generate a global view of the surrounding environment;
an eye tracking unit configured to track the eye positions of the road user;
a communications circuitry located with the autonomous vehicle;
a computing device operatively connected to the image processor, the communications circuitry, the plurality of notification devices, the eye tracker and the plurality of sensors, the computing device including a computer-readable medium comprising program instructions, executable by -processing circuitry, to cause the processing circuitry to:
determine a head pose and a body posture of the road user from the global image;
determine a gaze direction of the road user based on the eye positions, the head pose and the body posture of the road user;
determine a field of view of the road user based on the gaze direction;
estimate the intent of the road user to move into a trajectory of the autonomous vehicle;
predict whether the road user has an unoccluded field of view of one of the plurality of eHMI displays located on the autonomous vehicle based on the gaze direction of the road user;
when the at least one road user has an unoccluded field of view of the EMHI display located on the autonomous vehicle, generate an eHMI notification which includes at least one of a message and a symbol indicating the trajectory of the autonomous vehicle;

provide the eHMI notification on the eHMI displays which is within an unoccluded field of view of the road user;

when the eHMI display of the autonomous vehicle is not within the unoccluded view of the at least one road user, identify nearby autonomous vehicles within the global view;

request that the nearby autonomous vehicles form a mesh network with the autonomous vehicle with the autonomous vehicle as a cluster head;

request, from each nearby autonomous vehicle, recorded images of the environment surrounding the nearby autonomous vehicle;

receive the recorded images from each nearby autonomous vehicle;

receive trajectory information from each of the nearby autonomous vehicles;

stitch together the recorded images and update the global view to form an updated global view of the environment;

correlate the updated global view with the trajectory information of each of the nearby autonomous vehicles;

identify an eHMI display on one of the nearby autonomous vehicles which is within an unoccluded field of view of the road user based on the gaze direction of the road user;

generate a group eHMI notification which includes at least one of a message and a symbol indicating the trajectories of the autonomous vehicle and at least one of the nearby autonomous vehicles; and transmit the group eHMI notification to the nearby autonomous vehicle having an eHMI display which is within an unoccluded field of view of the road user with a request to display the group eHMI notification on the eHMI display.

10. The system of claim 9, wherein the plurality of sensors include at least one of a plurality of cameras, a plurality of LiDAR sensors and a plurality of radar sensors mounted on the autonomous vehicle.

11. The system of claim 9, wherein:
the computing device further comprises an image processing circuitry configured to timestamp the images and an image analysis circuitry configured to execute the program instructions to
stitch together an environmental map and the timestamped images to form a global view of the surrounding environment on the environmental map,
identify a road user in the global view; and
estimate the intent of the road user to intersect with the trajectory of the autonomous vehicle by analyzing a plurality of successive images of the road user and identifying changes between the successive images which indicate motion of the road user towards the trajectory of the autonomous vehicle.

12. The system of claim 9, wherein the computing device further comprises:
a database configured to store a plurality of eHMI notification messages and a plurality of external display positions for each autonomous vehicle; and
an eHMI notification module configured to analyze the combined global view and retrieve an eHMI notification relevant to the trajectory of the road user, the trajectory of the autonomous vehicle and the trajectories of the nearby autonomous vehicles from the database.

13. The system of claim 9, wherein the computing device further comprises:
an eHMI display position determination unit configured to analyze the combined global view, the eHMI notification for each road user, the head position, the body pose and the gaze direction of each road user to determine at least one HMI display position on an autonomous vehicle which is within the field of view of each road user.

14. The system of claim 11, wherein the computing device further comprises:
an eHMI display position determination module configured to analyze the global view, the eHMI notification for the road user, the head position and the gaze direction of the road user to determine at least one eHMI display position on the nearby autonomous vehicle which is within the field of view of the road user.

15. A non-transitory computer readable medium having instructions stored therein that, when executed by one or more processors, cause the one or more processors to perform a method for displaying by an autonomous vehicle a group at least one external human-machine interface (eHMI) notification to least one road user, comprising:

recording, by one or more cameras, LiDAR sensors and radar sensors located within the autonomous vehicle, images of an environment surrounding the autonomous vehicle;

generating, by an image processor connected to the one or more cameras, LiDAR sensors and radar sensors, a global view of the environment based on the images;

detecting whether there is at least one road user in the global view which is travelling on a trajectory which intersects a trajectory of the autonomous vehicle;

determining a gaze direction of the at least one road user;

predicting whether the at least one road user has an unoccluded view of an eHMI display located on the autonomous vehicle based on the gaze direction;

when it is predicted that the at least one road user has an unoccluded view of the EMHI display located on the autonomous vehicle, generating an eHMI notification which includes at least one of a message and a symbol indicating the trajectory of the autonomous vehicle;

transmitting the eHMI notification to the eHMI display on the autonomous vehicle which is within the unoccluded view of the gaze direction of the at least one road user;

when it is predicted that the eHMI display of the autonomous vehicle is not within the unoccluded view of the at least one road user, identifying nearby autonomous vehicles within the global view;

requesting that the nearby autonomous vehicles form a mesh network with the autonomous vehicle with the autonomous vehicle as a cluster head;

requesting from each nearby autonomous vehicle, recorded images of the environment surrounding the nearby autonomous vehicle;

receiving the recorded images from each nearby autonomous vehicle;

receiving trajectory information from each of the nearby autonomous vehicles;

stitching together the recorded images and updating the global view to form an updated global view of the environment;

correlating the updated global view with the trajectory information of each of the nearby autonomous vehicles;

identifying an eHMI display on one of the nearby autonomous vehicles which is within an unoccluded field of view of the road user based on the gaze direction of the road user;

generating a group eHMI notification which includes at least one of a message and a symbol indicating the trajectories of the autonomous vehicle and at least one of the nearby autonomous vehicles; and transmitting the group eHMI notification to the nearby autonomous vehicle having an eHMI display which is within an unoccluded field of view of the road user with a request to display the group eHMI notification on the eHMI display.

16. The non-transitory computer readable medium method of claim 15, further comprising:

determining an intent of the road user to intersect with one or more of the trajectories by analyzing a plurality of successive images of the road user and identifying changes between the successive images which indicate motion of the road user towards one or more of the trajectories.

17. The non-transitory computer readable medium method of claim 15, further comprising:

determining, from the updated global view, whether there are non-autonomous vehicles on the trajectory of the road user which are not visible to the road user;

determining a trajectory for each non-autonomous vehicle;

generating a group eHMI notification which indicates the plurality of trajectories of the nearby autonomous vehicles and the trajectories of the non-autonomous vehicles on a common or intersecting trajectory of the road user; and displaying the group eHMI notification on a display of at least one nearby autonomous vehicle which is within the field of view of a driver of each non-autonomous vehicle based on the gaze direction of the driver.

* * * * *